US009367864B2

(12) United States Patent
Lee et al.

(10) Patent No.: US 9,367,864 B2
(45) Date of Patent: Jun. 14, 2016

(54) EXPERIENCE SHARING WITH COMMENTING

(71) Applicant: Google Inc., Mountain View, CA (US)

(72) Inventors: Steven John Lee, San Francisco, CA (US); Indika Charles Mendis, Mountain View, CA (US); Max Benjamin Braun, San Francisco, CA (US); Liang-Yu Tom Chi, San Francisco, CA (US); Bradley James Rhodes, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/662,495

(22) Filed: Mar. 19, 2015

(65) Prior Publication Data

US 2015/0304253 A1    Oct. 22, 2015

Related U.S. Application Data

(63) Continuation of application No. 13/314,176, filed on Dec. 8, 2011, now Pat. No. 9,015,245.

(60) Provisional application No. 61/510,020, filed on Jul. 20, 2011.

(51) Int. Cl.
*G06F 15/16* (2006.01)
*G06Q 30/06* (2012.01)
(Continued)

(52) U.S. Cl.
CPC ............ *G06Q 30/06* (2013.01); *G06Q 30/0625* (2013.01); *G06Q 30/0641* (2013.01);
(Continued)

(58) Field of Classification Search
CPC ... H04L 12/585; H04L 12/5855; H04L 51/12; H04L 52/14; H04L 12/1822; H04L 51/14
USPC ......... 709/204, 206, 207, 217–219, 223, 224, 709/227, 232
See application file for complete search history.

(56) References Cited

U.S. PATENT DOCUMENTS 7,546,352 B1 * 6/2009 Bhattiprolu .......... G06Q 10/107
                                                            709/204
7,683,937 B1    3/2010 Blumenfeld
(Continued)

FOREIGN PATENT DOCUMENTS

WO    2009/052618    4/2009
WO    2010/007612    1/2010

OTHER PUBLICATIONS

Cesar, Pablo, Enhancing Social Sharing of Videos: Fragment, Annotate, Enrich, and Share, ACM, Oct. 2008.
(Continued)

*Primary Examiner* — Liangche A Wang
*Assistant Examiner* — Johnny Aguiar
(74) *Attorney, Agent, or Firm* — McDonnell Boehnen Hulbert & Berghoff LLP

(57) ABSTRACT

Exemplary embodiments involve real-time commenting in experience-sharing sessions. An exemplary method involves: (a) a server system facilitating an experience sharing session between a sharing device and one or more viewing devices, wherein the server system receives media in real-time from the sharing device and transmits the media to the one or more viewing devices in real-time, wherein the media comprises video; (b) during the experience sharing session, the server system receiving one or more comments from one or more of the viewing devices; (d) the server system filtering the received comments in real-time based on filter criteria; and (e) the server system initiating real-time delivery, to the sharing device, of one or more of the received comments that satisfy the filter criteria.

18 Claims, 11 Drawing Sheets

(51) Int. Cl.
  *H04L 29/06*     (2006.01)
  *H04L 12/18*     (2006.01)
  *H04L 12/58*     (2006.01)
(52) U.S. Cl.
  CPC ........ *G06Q30/0643* (2013.01); *H04L 12/1822* (2013.01); *H04L 29/06476* (2013.01); *H04L 51/046* (2013.01); *H04L 65/1069* (2013.01); *H04L 65/4076* (2013.01); *H04L 12/585* (2013.01); *H04L 12/5855* (2013.01); *H04L 51/12* (2013.01); *H04L 51/14* (2013.01)

(56) References Cited

U.S. PATENT DOCUMENTS

| | | | |
|---|---|---|---|
| 7,711,961 B2 | 5/2010 | Fujinuma et al. | |
| 7,742,184 B2 | 6/2010 | Seki et al. | |
| 2002/0178165 A1* | 11/2002 | Ohashi | G06Q 30/02 |
| 2003/0163339 A1 | 8/2003 | Elliot | |
| 2004/0154022 A1* | 8/2004 | Boss | G06Q 10/107 719/310 |
| 2004/0201695 A1 | 10/2004 | Inasaka | |
| 2005/0138560 A1 | 6/2005 | Lee et al. | |
| 2005/0266884 A1 | 12/2005 | Marriott et al. | |
| 2005/0267826 A1 | 12/2005 | Levy et al. | |
| 2006/0132382 A1 | 6/2006 | Jannard | |
| 2007/0088793 A1* | 4/2007 | Landsman | H04L 12/581 709/207 |
| 2008/0023002 A1 | 1/2008 | Guelzow et al. | |
| 2008/0103877 A1 | 5/2008 | Gerken | |
| 2008/0134235 A1 | 6/2008 | Kalaboukis | |
| 2008/0162642 A1* | 7/2008 | Bachiri | H04L 51/04 709/206 |
| 2008/0270541 A1 | 10/2008 | Keener et al. | |
| 2009/0013052 A1* | 1/2009 | Robarts | G06F 17/30867 709/206 |
| 2009/0013263 A1 | 1/2009 | Fortnow et al. | |
| 2009/0019176 A1 | 1/2009 | Debrosse | |
| 2009/0063632 A1 | 3/2009 | Jung et al. | |
| 2009/0083383 A1 | 3/2009 | Piper et al. | |
| 2009/0157816 A1 | 6/2009 | Pattan | |
| 2009/0189981 A1 | 7/2009 | Siann et al. | |
| 2009/0215477 A1 | 8/2009 | Lee et al. | |
| 2009/0219166 A1 | 9/2009 | MacFarlane et al. | |
| 2009/0288168 A1 | 11/2009 | Maghsoodnia et al. | |
| 2010/0020229 A1 | 1/2010 | Hershey et al. | |
| 2010/0042470 A1* | 2/2010 | Chang | G06Q 30/02 705/14.64 |
| 2010/0082759 A1* | 4/2010 | Nalliah | G06F 3/0482 709/206 |
| 2010/0125531 A1* | 5/2010 | Wong | G06Q 30/02 705/347 |
| 2010/0146118 A1* | 6/2010 | Wie | H04L 67/306 709/225 |
| 2010/0161635 A1 | 6/2010 | Dey | |
| 2010/0199340 A1 | 8/2010 | Jonas et al. | |
| 2010/0277563 A1* | 11/2010 | Gupta | H04N 7/142 348/14.08 |
| 2011/0032324 A1 | 2/2011 | George et al. | |
| 2011/0035453 A1 | 2/2011 | Koul et al. | |
| 2011/0055046 A1 | 3/2011 | Bowen et al. | |
| 2011/0096168 A1 | 4/2011 | Siann et al. | |
| 2011/0107220 A1 | 5/2011 | Perlman | |
| 2011/0140913 A1 | 6/2011 | Montenero | |
| 2011/0202606 A1* | 8/2011 | Agarwal | H04L 12/1859 709/206 |
| 2011/0221657 A1 | 9/2011 | Haddick et al. | |
| 2011/0246421 A1 | 10/2011 | Takahashi | |
| 2012/0056972 A1 | 3/2012 | Benedeki et al. | |
| 2012/0124144 A1* | 5/2012 | Woley | H04L 12/585 709/206 |
| 2012/0166453 A1* | 6/2012 | Broder | G06Q 10/10 707/752 |
| 2012/0182384 A1 | 7/2012 | Anderson et al. | |
| 2012/0188345 A1 | 7/2012 | Salow | |
| 2012/0320013 A1* | 12/2012 | Perez | H04N 9/8205 345/207 |

OTHER PUBLICATIONS

Heater, Brian, Color for Facebook iPhone App Hands-On, available online at http://www.engadget.com/2011/12/01/color-for-facebook-iphone-app-hands-on/ (last visited Dec. 6, 2011).

Martin, Reed, et al., neXtream: A Multi-Device, Social Approach to Video Content Consumption, MIT Media Lab, IEEE, 2010.

Sound Cloud, Your Sound, In the Player, available online at http://soundcloud.com/tour/ (last visited Dec. 6, 2011).

Wikimedia Foundation Inc., Ustream, Nov. 17, 2011 available online at http://en.wikipedia.org/wiki/Ustream (last visited Dec. 6, 2011).

* cited by examiner

EXPERIENCE SHARING WITH COMMENTING

CROSS REFERENCE TO RELATED APPLICATIONS

This application is a continuation of U.S. patent application Ser. No. 13/314,176, entitled "Experience Sharing with Commenting," filed Dec. 8, 2011, which claims priority to U.S. Patent App. No. 61/510,020, filed Jul. 20, 2011, entitled "Experience Sharing", which are both incorporated by reference herein in their entirety for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method may involve a server system: (a) facilitating an experience sharing session between a sharing device and one or more viewing devices, wherein the server system receives media in real-time from the sharing device and transmits the media to the one or more viewing devices in real-time, wherein the media comprises video; (b) during the experience sharing session, receiving one or more comments from one or more of the viewing devices; (c) filtering the received comments in real-time based on filter criteria; and (d) initiating real-time delivery, to the sharing device, of one or more of the received comments that satisfy the filter criteria.

In another aspect, an exemplary system may include a non-transitory computer readable medium and program instructions stored on the non-transitory computer readable medium. The program instructions may be executable by at least one processor to: (a) facilitate an experience sharing session between a sharing device and one or more viewing devices by receiving media in real-time from the sharing device and transmitting the media to the one or more viewing devices in real-time, wherein the media comprises video; (b) during the experience sharing session, receive one or more comments from one or more of the viewing devices; (c) filter the received comments in real-time based on filter criteria; and (d) initiate delivery, to the sharing device, of one or more of the received comments that satisfy the filter criteria.

In yet another aspect, an exemplary article of manufacture is disclosed that includes a computer-readable storage medium having instructions stored thereon that, in response to execution by a processor, cause the processor to perform certain functions. The instructions include: (a) instructions for facilitating an experience sharing session between a sharing device and one or more viewing devices, wherein the server system receives media in real-time from the sharing device and transmits the media to the one or more viewing devices in real-time, wherein the media comprises video; (b) instructions for, during the experience sharing session, receiving one or more comments from one or more of the viewing devices; (c) instructions for filtering the received comments in real-time based on filter criteria; and (d) instructions for initiating real-time delivery, to the sharing device, of one or more of the received comments that satisfy the filter criteria.

In an additional aspect, an exemplary computer-implemented method may involve a sharing device: (a) engaging in an experience sharing session between the sharing device and one or more viewing devices, wherein the sharer device transmits media in real-time to the one or more viewing devices via a server, wherein the media comprises video; (b) during the experience sharing session, receiving one or more comments from one or more of the viewing devices; (c) filtering the received comments in real-time based on display criteria; and (d) displaying in real-time one or more of the received comments that satisfy the display criteria.

In a further aspect, an exemplary sharing-device system may include a non-transitory computer readable medium and program instructions stored on the non-transitory computer readable medium. The program instructions may be executable by at least one processor to: (a) engage in an experience sharing session between the sharing device and one or more viewing devices, wherein the sharer device transmits media in real-time to the one or more viewing devices via a server, wherein the media comprises video; (b) during the experience sharing session, receive one or more comments from one or more of the viewing devices; (c) filter the received comments in real-time based on display criteria; and (d) display in real-time one or more of the received comments that satisfy the display criteria.

These as well as other aspects, advantages, and alternatives, will become apparent to those of ordinary skill in the art by reading the following detailed description, with reference where appropriate to the accompanying drawings.

DETAILED DESCRIPTION

Figure 1:
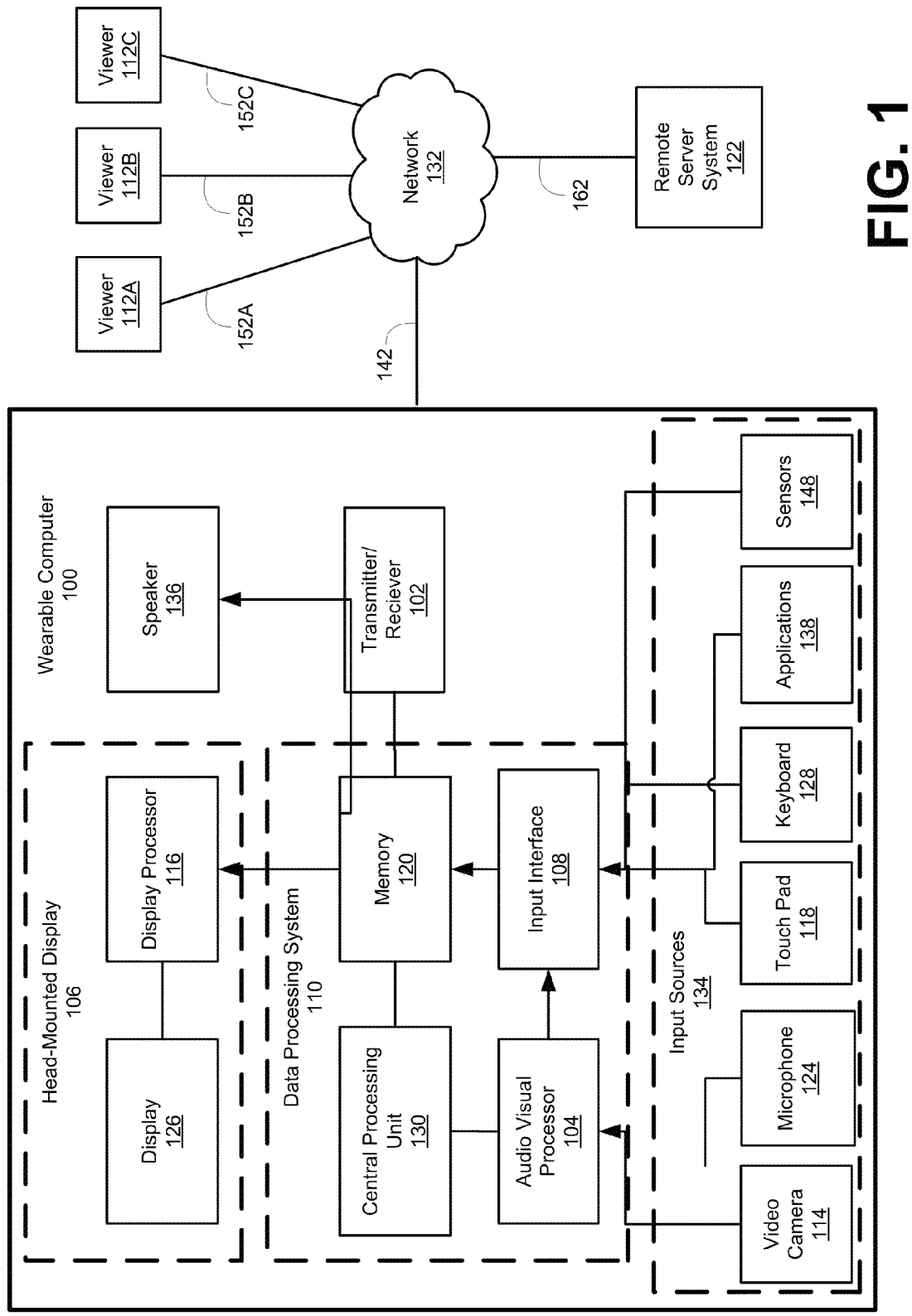
FIG. 1 is a simplified diagram of a sharing device, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Overview of Experience Sharing

Experience sharing generally involves a user sharing media that captures their experience with one or more other users. In an exemplary embodiment, a user may use a wearable computing device or another computing device to capture media that conveys the world as they are experiencing it, and then transmit this media to others in order to share their experience. For example, in an experience-sharing session (ESS), a user may share a point-of-view video feed captured by a video camera on a head-mounted display of their wearable computer, along with a real-time audio feed from a microphone of their wearable computer. Many other examples are possible as well.

In an experience-sharing session, the computing device that is sharing a user's experience may be referred to as a "sharing device" or a "sharer," while the computing device or devices that are receiving real-time media from the sharer may each be referred to as a "viewing device" or a "viewer." Additionally, the content that is shared by the sharing device during an experience-sharing session may be referred to as a "share." Further, a computing system that supports an experience-sharing session between a sharer and one or more viewers may be referred to as a "server", an "ES server," "server system," or "supporting server system."

In some exemplary methods, the sharer may transmit a share in real time to the viewer, allowing the experience to be portrayed as it occurs. In this case, the sharer may also receive and present comments from the viewers. For example, a sharer may share the experience of navigating a hedge maze while receiving help or criticism from viewers. In another embodiment, the server may store a share so that new or original viewers may access the share outside of real time.

A share may include a single type of media content (i.e., a single modality of media), or may include multiple types of media content (i.e., multiple modalities of media). In either case, a share may include a video feed, a three-dimensional (3D) video feed (e.g., video created by two cameras that is combined to create 3D video), an audio feed, a text-based feed, an application-generated feed, and/or other types of media content.

Further, in some embodiments a share may include multiple instances of the same type of media content. For example, in some embodiments, a share may include two or more video feeds. For instance, a share could include a first video feed from a forward-facing camera on a head-mounted display (HMD), and a second video feed from a camera on the HMD that is facing inward towards the wearer's face. As another example, a share could include multiple audio feeds for stereo audio or spatially-localized audio providing surround sound.

In some implementations, a server may allow a viewer to participate in a voice chat that is associated with the experience-sharing session in which they are a viewer. For example, a server may support a voice chat feature that allows viewers and/or the sharer in an experience-sharing session to enter an associated voice-chat session. The viewers and/or the sharer who participate in a voice-chat session may be provided with a real-time audio connection with one another, so that each of those devices can play out the audio from all the other devices in the session. In an exemplary embodiment, the serving system supporting the voice-chat session may sum or mix the audio feeds from all participating viewers and/or the sharer into a combined audio feed that is output to all the participating devices. Further, in such an embodiment, signal processing may be used to minimize noise when audio is not received from a participating device (e.g., when the user of that device is not speaking) Further, when a participant exits the chat room, that participant's audio connection may be disabled. (Note however, that they may still participate in the associated experience-sharing session.) This configuration may help to create the perception of an open audio communication channel.

In a further aspect, a server could also support a video-chat feature that is associated with an experience-sharing session. For example, some or all of the participants in a video chat could stream a low-resolution video feed. As such, participants in the video chat may be provided with a view of a number of these low-resolution video feeds on the same screen as the video from a sharer, along with a combined audio feed as described above. For instance, low-resolution video feeds from viewers and/or the sharer could be displayed to a participating viewer. Alternatively, the supporting server may determine when a certain participating device is transmitting speech from its user, and update which video or videos are displayed based on which participants are transmitting speech at the given point in time.

In either scenario above, and possibly in other scenarios, viewer video feeds may be formatted to capture the users themselves, so that the users can be seen as they speak. Further, the video from a given viewer or the sharer may be processed to include a text caption including, for example, the name of a given device's user or the location of device. Other processing may also be applied to video feeds in a video chat session.

In some embodiments, a video chat session may be established that rotates the role of sharer between different participating devices (with those devices that are not designated as the sharer at a given point in time acting as a viewer.) For example, when a number of wearable computers are involved in a rotating-sharer experience-sharing session, the supporting server system may analyze audio feeds from the participating wearable computers to determine which wearable computer is transmitting audio including the associated user's speech. Accordingly, the server system may select the video from this wearable computer and transmit the video to all the other participating wearable computers. The wearable computer may be de-selected when it is determined that speech is no longer being received from it. Alternatively, the wearable computer may be de-selected after waiting for a predetermined amount of time after it ceases transmission of speech.

In a further aspect, the video from some or all the wearable computers that participate in such a video chat session may capture the experience of the user that is wearing the respective wearable computer. Therefore, when a given wearable computer is selected, this wearable computer is acting as the sharer in the experience-sharing session, and all the other wearable computers are acting as viewers. Thus, as different wearable computers are selected, the role of the sharer in the experience-sharing session is passed between these wearable computers. In this scenario, the sharer in the experience-sharing session is updated such that the user who is speaking at a given point in time is sharing what they are seeing with the other users in the session.

In a variation on the above-described video-chat application, when multiple participants are acting a sharers and transmitting a share, individual viewers may be able to select which share they receive, such that different viewers may be concurrently receiving different shares.

In another variation on the above-described video-chat application, the experience-sharing session may have a "directing viewer" that may select which shares or shares will be displayed at any given time. This variation may be particularly useful in an application of a multi-sharer experience-sharing session, in which a number of viewers are all transmitting a share related to a certain event. For instance, each member of a football team could be equipped with a helmet-mounted camera. As such, all members of the team could act as sharers in a multi-sharer experience-sharing session by transmitting a real-time video feed from their respective helmet-mounted cameras. A directing viewer, could then select which video feeds to display at a given time. For example, at a given point in time, the directing viewer might select a video feed or feeds from a member or members that are involved in a play that is currently taking place.

In a further aspect of such an embodiment, the supporting server system may be configured to resolve conflicts if multiple devices transmit speech from their users simultaneously. Alternatively, the experience-sharing session interface for participants may be configured to display multiple video feeds at once (i.e., to create multiple simultaneous sharers in the experience-sharing session). For instance, if speech is received from multiple participating devices at once, a participating device may divide its display to show the video feeds from some or all of the devices from which speech is simultaneously received.

In a further aspect, a device that participates in an experience-sharing session, may store the share or portions of the share for future reference. For example, in a video-chat implementation, a participating device and/or a supporting server system may store the video and/or audio that is shared during the experience-sharing session. As another example, in a video-chat or voice-chat session, a participating device and/or a supporting server system may store a transcript of the audio from the session.

a. Exemplary Server System Architecture

FIG. 1 is a simplified diagram of a sharing device, according to an exemplary embodiment. In particular, FIG. 1 shows a wearable computer 100 that is configured to serve as the sharer in an experience-sharing session. It should be understood, however, that other types of computing devices may be configured to provide similar sharing-device functions and/or may include similar components as those described in reference to wearable computer 100, without departing from the scope of the invention.

As shown, wearable computer 100 includes a head-mounted display (HMD) 106, several input sources 134, a data processing system, and a transmitter/receiver 102. FIG. 1 also indicates that a communicative link 142, could be established between the wearable computer 100 and a network. Further, the network could connect to a server 122 and one or more viewers 112A, 112B, and 112C through additional connections 162, 152A, 152B, and 152C.

An exemplary set of input sources 134 are shown in FIG. 1 as features of the wearable computer including: a video camera 114, a microphone 124, a touch pad 118, a keyboard 128, one or more applications 138, and other general sensors 148 (e.g. biometric sensors). The input sources 134 may be internal, as shown in FIG. 1, or the input sources 134 may be in part or entirely external. Additionally, the input sources 134 shown in FIG. 1 should not be considered exhaustive, necessary, or inseparable. Exemplary embodiments may exclude any of the exemplary set of input devices 134 and/or include one or more additional input devices that may add to an experience-sharing session.

The exemplary data processing system 110 may include a memory system 120, a central processing unit (CPU) 130, an input interface 108, and an audio visual (A/V) processor 104. The memory system 120 may be configured to receive data from the input sources 134 and/or the transmitter/receiver 102. The memory system 120 may also be configured to store received data and then distribute the received data to the CPU 130, the HMD 106, a set of one or more speakers 136, or to a remote device through the transmitter/receiver 102. The CPU 130 may be configured to detect a stream of data in the memory system 120 and control how the memory system distributes the stream of data. The input interface 108 may be configured to process a stream of data from the input sources 134 and then transmit the processed stream of data into the memory system 120. This processing of the stream of data converts a raw signal, coming directly from the input sources 134 or A/V processor 104, into a stream of data that other elements in the wearable computer 100, the viewers 112, and the server 122 can use. The A/V processor 104 may be configured perform audio and visual processing on one or more audio feeds from one or more microphones 124 and on one or more video feeds from one or more video cameras 114. The CPU 130 may be configured to control the audio and visual processing performed on the one or more audio feeds and the one or more video feeds. Examples of audio and video processing techniques, which may be performed by the A/V processor 104, will be given later.

The transmitter/receiver 102 may be configured to communicate with one or more remote devices through the communication network 132. Each connection made to the network (142, 152A, 152B, 152C, and 162) may be configured to support two-way communication and may be wired or wireless.

The HMD 106 may be configured to display visual objects derived from many types of visual multimedia, including video, text, graphics, pictures, application interfaces, and animations. In some embodiments, one or more speakers 136 may also present audio objects. Some embodiments of an HMD 106 may include a visual processor 116 to store and transmit a visual object to a physical display 126, which actually presents the visual object. The visual processor 116 may also edit the visual object for a variety of purposes. One purpose for editing a visual object may be to synchronize displaying of the visual object with presentation of an audio object to the one or more speakers 136. Another purpose for editing a visual object may be to compress the visual object to reduce load on the display. Still another purpose for editing a visual object may be to correlate displaying of the visual object with other visual objects currently displayed by the HMD 106.

While FIG. 1 illustrates a wearable computer configured to act as sharing device, it should be understood that a sharing device may take other forms. For example, a sharing device may be a mobile phone, a tablet computer, a personal computer, or any other computing device configured to provide the sharing device functionality described herein.

In general, it should be understood that any computing system or device described herein may include or have access to memory or data storage, which may take include a non-transitory computer-readable medium having program instructions stored thereon. Additionally, any computing system or device described herein may include or have access to one or more processors. As such, the program instructions stored on such a non-transitory computer-readable medium may be executable by at least one processor to carry out the functionality described herein.

Further, while not discussed in detail, it should be understood that the components of a computing device that serves as a viewing device in an experience-sharing session may be similar to those of a computing device that serves as a sharing device in an experience-sharing session. Further, a viewing device may take the form of any type of networked device capable of providing a media experience (e.g., audio and/or video), such as television, a game console, and/or a home theater system, among others.

b. Exemplary Device Architecture

Figure 2A:
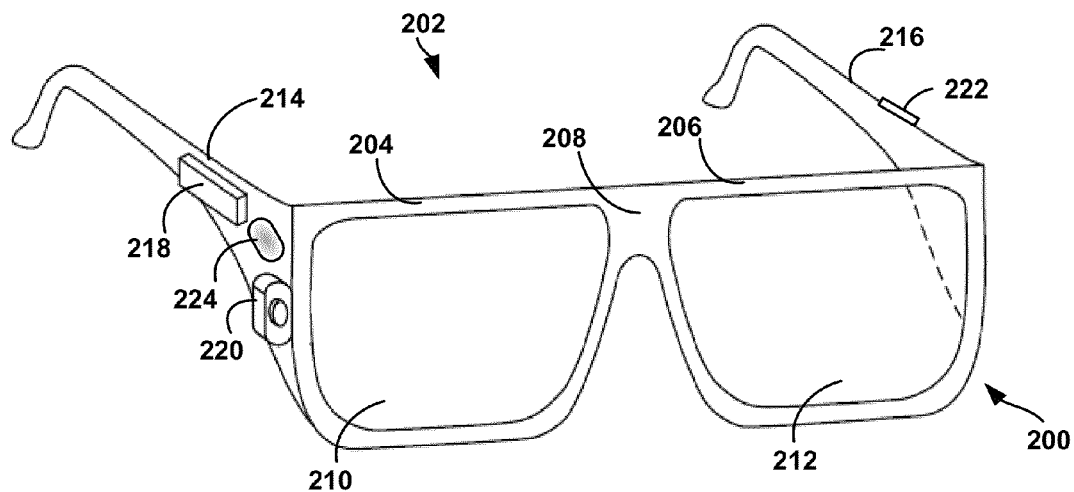
FIG. 2A illustrates an example of a wearable computing device.

FIG. 2A illustrates an example of a wearable computing device. While FIG. 2A illustrates a head-mounted device 202 as an example of a wearable computing device, other types of wearable computing devices could additionally or alternatively be used. As illustrated in FIG. 2A, the head-mounted device 202 comprises frame elements including lens-frames 204, 206 and a center frame support 208, lens elements 210, 212, and extending side-arms 214, 216. The center frame support 208 and the extending side-arms 214, 216 are configured to secure the head-mounted device 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the head-mounted device 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the head-mounted device 202 to the user. The extending side-arms 214, 216 may further secure the head-mounted device 202 to the user by extending around a rear portion of the user's head. Additionally or alternatively, for example, the system 200 may connect to or be affixed within a head-mounted helmet structure. Other possibilities exist as well.

The system 200 may also include an on-board computing system 218, a video camera 220, a sensor 222, and a finger-operable touch pad 224. The on-board computing system 218 is shown to be positioned on the extending side-arm 214 of the head-mounted device 202; however, the on-board computing system 218 may be provided on other parts of the head-mounted device 202 or may be positioned remote from the head-mounted device 202 (e.g., the on-board computing system 218 could be wire- or wirelessly-connected to the head-mounted device 202). The on-board computing system 218 may include a processor and memory, for example. The on-board computing system 218 may be configured to receive and analyze data from the video camera 220 and the finger-operable touch pad 224 (and possibly from other sensory devices, user interfaces, or both) and generate images for output by the lens elements 210 and 212.

The video camera 220 is shown positioned on the extending side-arm 214 of the head-mounted device 202; however, the video camera 220 may be provided on other parts of the head-mounted device 202. The video camera 220 may be configured to capture images at various resolutions or at different frame rates. Many video cameras with a small form-factor, such as those used in cell phones or webcams, for example, may be incorporated into an example of the system 200.

Further, although FIG. 2A illustrates one video camera 220, more video cameras may be used, and each may be configured to capture the same view, or to capture different views. For example, the video camera 220 may be forward facing to capture at least a portion of the real-world view perceived by the user. This forward facing image captured by the video camera 220 may then be used to generate an augmented reality where computer generated images appear to interact with the real-world view perceived by the user.

The sensor 222 is shown on the extending side-arm 216 of the head-mounted device 202; however, the sensor 222 may be positioned on other parts of the head-mounted device 202. The sensor 222 may include one or more of a gyroscope or an accelerometer, for example. Other sensing devices may be included within, or in addition to, the sensor 222 or other sensing functions may be performed by the sensor 222.

The finger-operable touch pad 224 is shown on the extending side-arm 214 of the head-mounted device 202. However, the finger-operable touch pad 224 may be positioned on other parts of the head-mounted device 202. Also, more than one finger-operable touch pad may be present on the head-mounted device 202. The finger-operable touch pad 224 may be used by a user to input commands. The finger-operable touch pad 224 may sense at least one of a position and a movement of a finger via capacitive sensing, resistance sensing, or a surface acoustic wave process, among other possibilities. The finger-operable touch pad 224 may be capable of sensing finger movement in a direction parallel or planar to the pad surface, in a direction normal to the pad surface, or both, and may also be capable of sensing a level of pressure applied to the pad surface. The finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

Figure 2B:
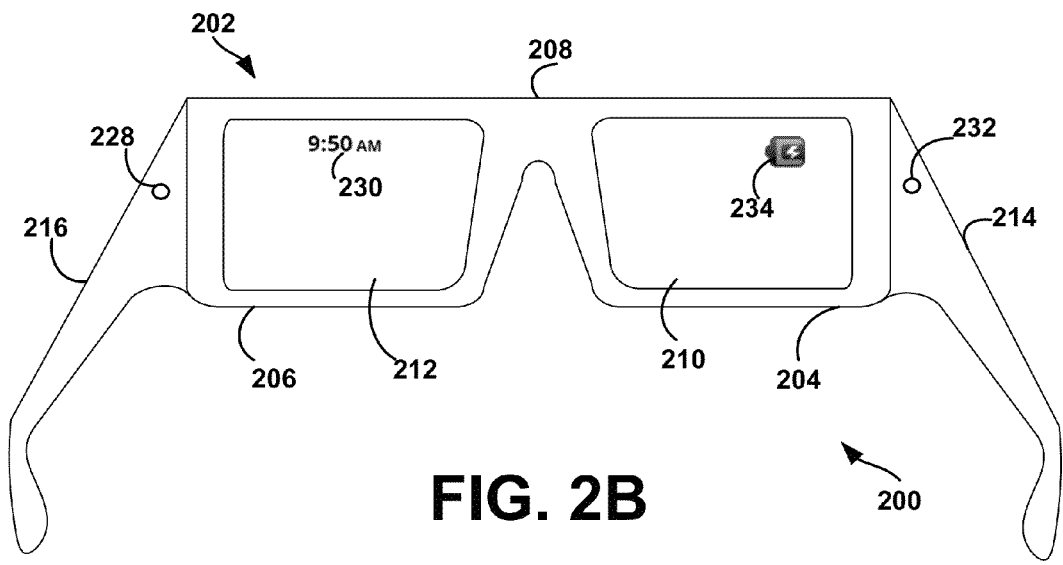
FIG. 2B illustrates an alternate view of the system 200 illustrated in FIG. 2A.

FIG. 2B illustrates an alternate view of the system 200 illustrated in FIG. 2A. As shown in FIG. 2B, the lens elements 210, 212 may act as display elements. The head-mounted device 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210, 212 may act as a combiner in a light projection system and may include a coating that reflects the light projected onto them from the projectors 228, 232. In some embodiments, a reflective coating may not be used (e.g., when the projectors 228, 232 are scanning laser devices).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 204, 206 for driving such a matrix display. Alternatively or additionally, a laser or LED source and scanning system could be used to draw a raster display directly onto the retina of one or more of the user's eyes. Other possibilities exist as well.

Figure 2C:
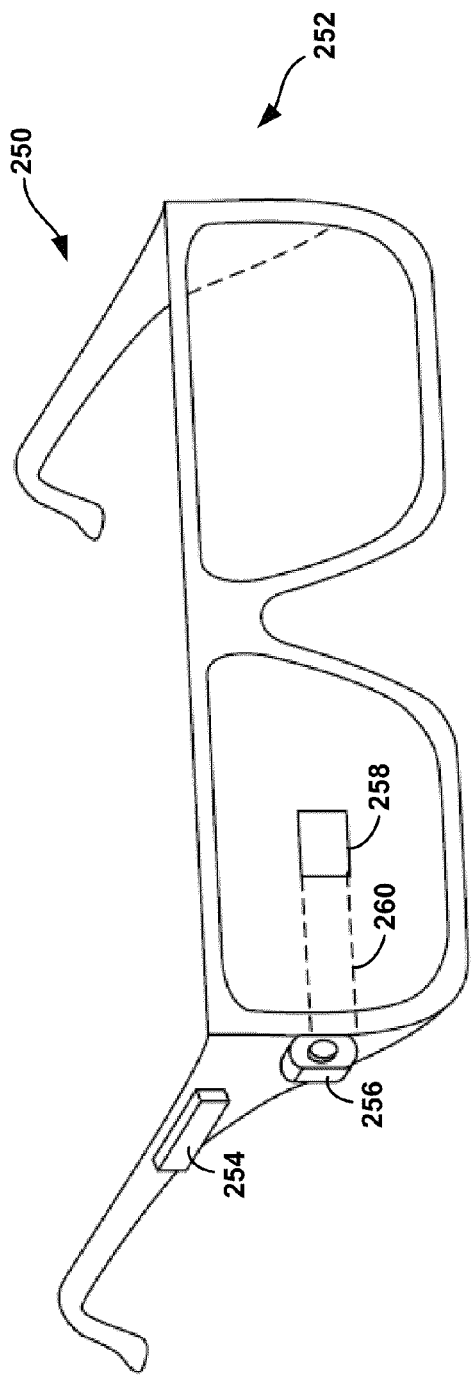
FIG. 2C illustrates an example system for receiving, transmitting, and displaying data.

FIG. 2C illustrates an example system for receiving, transmitting, and displaying data. The system 250 is shown in the form of a wearable computing device 252. The wearable computing device 252 may include frame elements and side-arms such as those described with respect to FIGS. 2A and 2B. The wearable computing device 252 may additionally include an on-board computing system 254 and a video camera 256, such as those described with respect to FIGS. 2A and 2B. The video camera 256 is shown mounted on a frame of the wearable computing device 252; however, the video camera 256 may be mounted at other positions as well.

As shown in FIG. 2C, the wearable computing device 252 may include a single display 258 which may be coupled to the device. The display 258 may be formed on one of the lens elements of the wearable computing device 252, such as a lens element described with respect to FIGS. 2A and 2B, and may be configured to overlay computer-generated graphics in the user's view of the physical world. The display 258 is shown to be provided in a center of a lens of the wearable computing device 252. However, the display 258 may be provided in other positions. The display 258 is controllable via the computing system 254 that is coupled to the display 258 via an optical waveguide 260.

Figure 2D:
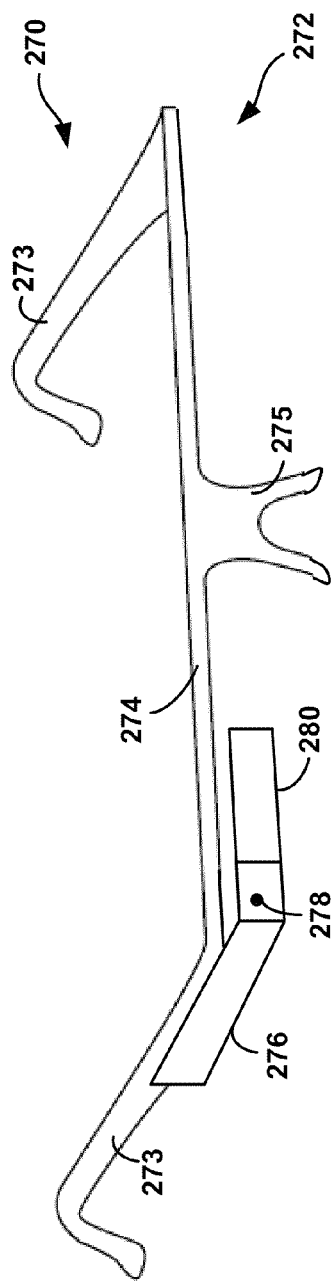
FIG. 2D illustrates an example system for receiving, transmitting, and displaying data.

FIG. 2D illustrates an example system for receiving, transmitting, and displaying data. The system 270 is shown in the form of a wearable computing device 272. The wearable computing device 272 may include side-arms 273, a center frame support 274, and a bridge portion with nosepiece 275. In the example shown in FIG. 2D, the center frame support 274 connects the side-arms 273. The wearable computing device 272 does not include lens-frames containing lens elements. The wearable computing device 272 may additionally include an on-board computing system 276 and a video camera 278, such as those described with respect to FIGS. 2A and 2B.

The wearable computing device 272 may include a single lens element 280 that may be coupled to one of the side-arms 273 or the center frame support 274. The lens element 280 may include a display such as the display described with reference to FIGS. 2A and 2B, and may be configured to overlay computer-generated graphics upon the user's view of the physical world. In one example, the single lens element 280 may be coupled to the inner side (i.e., the side exposed to a portion of a user's head when worn by the user) of the extending side-arm 273. The single lens element 280 may be positioned in front of or proximate to a user's eye when the wearable computing device 272 is worn by a user. For example, the single lens element 280 may be positioned below the center frame support 274, as shown in FIG. 2D.

As described in the previous section and shown in FIG. 1, some exemplary embodiments may include a set of audio devices, including one or more speakers and/or one or more microphones. The set of audio devices may be integrated in a wearable computer 202, 250, 270 or may be externally connected to a wearable computer 202, 250, 270 through a physical wired connection or through a wireless radio connection.

c. Cloud-Based Experience Sharing

In some exemplary embodiments a remote server may help reduce the sharer's processing load. In such embodiments, the sharing device may send the share to a remote, cloud-based serving system, which may function to distribute the share to the appropriate viewing devices. As part of a cloud-based implementation, the sharer may communicate with the server through a wireless connection, through a wired connection, or through a network of wireless and/or wired connections. The server may likewise communicate with the one or more viewers through a wireless connection, through a wired connection, or through a network of wireless and/or wired connections. The server may then receive, process, store, and/or transmit both the share from the sharer and comments from the viewers.

Figure 3A:
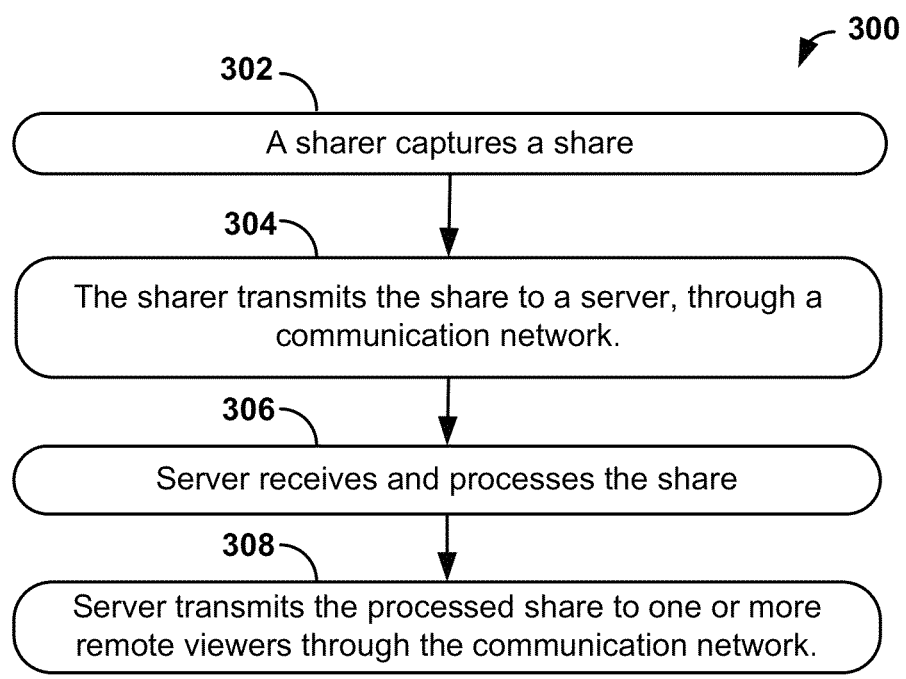
FIG. 3A is a flow chart illustrating a cloud-based method, according to an exemplary embodiment.

FIG. 3A is a flow chart illustrating a cloud-based method, according to an exemplary embodiment. In particular, method 300 may include the sharer capturing a share 302. Also, the sharer may transmit the share to a server through a communication network 304. Next, the server may receive and process the share 306. Then, the server may transmit the processed share to at least one viewer 308.

Figure 3B:
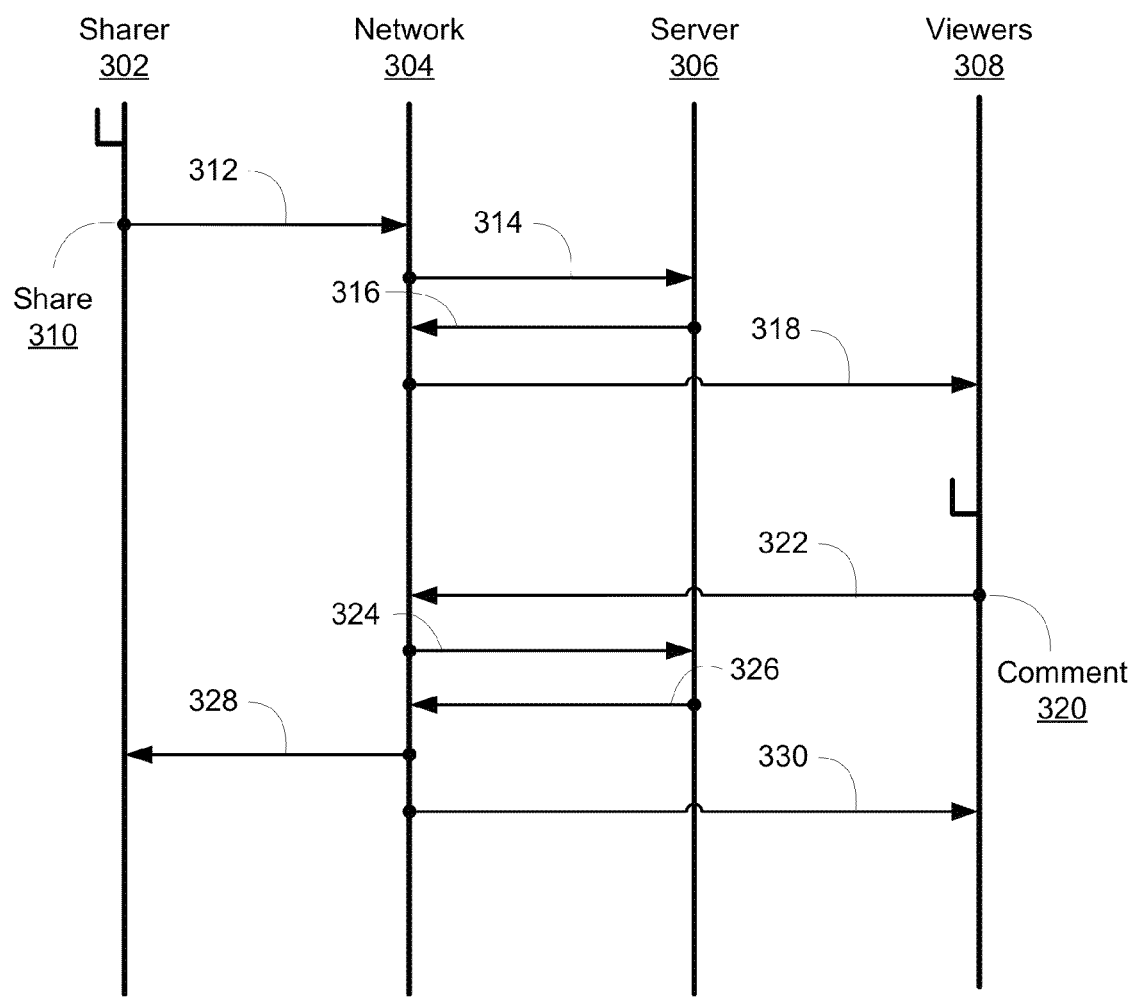
FIG. 3B shows an exemplary share-transmission path in a cloud-based experience-sharing session implementation.

FIG. 3B shows an exemplary share-transmission path in a cloud-based experience-sharing session implementation. As shown, a share 320 originates at the sharer 312. The sharer 312 may transmit 322 the share 320 to a network 314. The server 316 may then receive 324 the share from the network 314. The server 316 may process the share and transmit 326 the processed share back to the network 314 for distribution 328 to the viewers 318.

In some exemplary remote implementations, the server 316 may transmit (326 and 328) the share to the viewers 318 in real time. In another exemplary remote implementation, the server 316 may receive 324 a share 320 from the sharer 316, process the share, and then store the processed share for future retrieval by the viewers 318.

FIG. 3B also illustrates an exemplary comment-transmission path in a cloud-based experience-sharing session implementation. As shown, a comment 330 is created at the viewer 318. The viewer 318 may transmit 332 the comment 330 to the network 314. The server 316 may then receive 334 the comment from the network 314. The server 316 may process the comment and transmit 336 the processed comment back to the network 314 for distribution (338 and 330) to the sharer 312 and the viewers 318. This particular exemplary embodiment may not represent all or most cloud-based comment handling implementations, but is used as a reference transmission path.

An experience-sharing server may process a share in various ways before sending the share to a given viewer. For example, the server may format media components of a share to help adjust for a particular viewer's needs or preferences. For instance, consider a viewer that is participating in an experience-sharing session via a website that uses a specific video format. As such, when the share includes a video, the experience-sharing server may format the video in the specific video format used by the website before transmitting the video to this viewer. In another example, if a viewer is a PDA that can only play audio feeds in a specific audio format, the server may format an audio portion of a share in the specific audio format used by the PDA before transmitting the audio portion to this viewer. Other examples of formatting a share (or a portion of a share) for a given viewer are also possible. Further, in some instances, the ES server may format the same share in a different manner for different viewers in the same experience-sharing session.

Further, in some instances, an experience-sharing server may compress a share or a portion of a share before transmitting the share to a viewer. For instance, if a server receives a high-resolution share, it may be advantageous for the server to compress the share before transmitting it to the one or more viewers. For example, if a connection between a server and a certain viewer runs too slowly for real-time transmission of the high-resolution share, the server may temporally or spatially compress the share and send the compressed share to the viewer. As another example, if a viewer requires a slower frame rate for video feeds, a server may temporally compress a share by removing extra frames before transmitting the share to that viewer. And as another example, the server may be configured to save bandwidth by downsampling a video before sending the stream to a viewer that can only handle a low-resolution image. Additionally or alternatively, the server may be configured to perform pre-processing on the video itself, e.g., by combining multiple video sources into a single feed, or by performing near-real-time transcription (closed captions) and/or translation.

In some embodiments, a server (or possibly a sharing device) may generate a share preview for an experience-sharing session, which may be a reduced version of the share. The share preview may be reduced in that it only includes a portion of the media content from the share and/or in that it the media content is of a reduced quality. In some instances, a share preview may be provided to a user who has not yet joined an experience-sharing session, so that the user can preview the media content being shared. Other uses for a share preview may exist as well.

Yet further, an experiencing-sharing server may decompress a share, which may help to enhance the quality of an experience-sharing session. In some embodiments, to reduce transmission load on the connection between a sharer and a server, the sharer may compress a share before sending the share to the server. If transmission load is less of a concern for the connection between the server and one or more viewers, the server may decompress the share before sending it to the one or more viewers. For example, if a sharer uses a lossy spatial compression algorithm to compress a share before transmitting the share to a server, the server may apply a super-resolution algorithm (an algorithm which estimates sub-pixel motion, increasing the perceived spatial resolution of an image) to decompress the share before transmitting the share to the one or more viewers. In another implementation, the sharer may use a lossless data compression algorithm to compress a share before transmission to the server, and the server may apply a corresponding lossless decompression algorithm to the share so that the share may be usable by the viewer.

d. Exemplary Experience-Sharing Methods

An experience-sharing session may be initiated by one of several initiation techniques. For example, a sharer, a viewer, or an automated process may initiate an experience-sharing session. An experience-sharing session may be initiated in other ways as well.

The number and/or type of viewers in an experience-sharing session may vary according to the "session mode" of an experience-sharing session. Some exemplary session modes include: (a) a one-to-one mode, in which a single remote viewer receives a share; (b) a one-to-many mode, in which a group of remote viewers receive the share; and (c) a broadcast mode, in which the share is broadcast to a website (such as YouTube) where it can be viewed by anyone who is able to access the website. Further, in some embodiments, an experience-sharing session may involve a many-to-broadcast mode, or in other words, a particular group of participants acting as broadcast-mode sharers to broadcast their collective experience. Note that an example of a many-to-broadcast mode experience-sharing session is provided by the above example where all the members of a football team are sharers in an experience-sharing session. Other examples are also possible. Further, other session modes are also possible.

Figure 4:
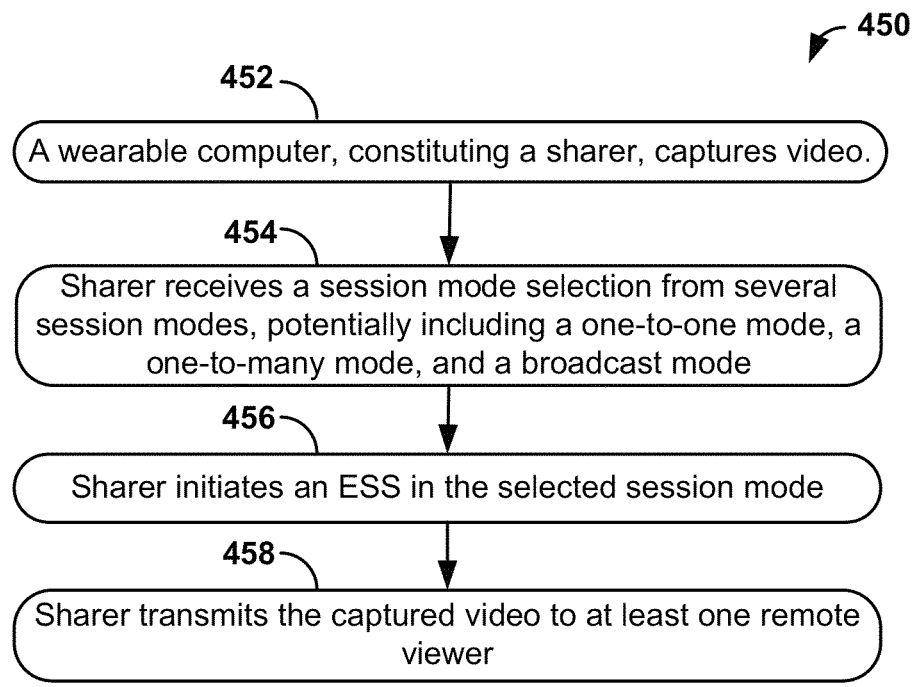
FIG. 4 is a flow chart illustrating an initiation method for an experience-sharing session, according to an exemplary embodiment.

FIG. 4 is a flow chart illustrating an initiation method for an experience-sharing session, according to an exemplary embodiment. The initiation method 450 may involve a sharer, such as a wearable computer, capturing a video, as shown by block 452. Further, this sharer may receive a session mode, selected from several session modes, including a one-to-one mode, a one-to-many mode, and a broadcast mode, as shown by block 454. Next, the sharer may initiate an experience-sharing session in the selected session mode, as shown by block 456. Then, the sharer may transmit the captured video to at least one remote viewer, as shown by block 458.

In a further aspect, when an experience-sharing session is initiated, a sharer may place restrictions on which viewers can join and/or participate in the experience-sharing session. For example, a sharer may enforce copyright restrictions on the content in the share. In this case, viewers must conform to distribution restrictions pertaining to the copyrighted material when accessing the share. As a further example, a sharer may only share a particular experience with geographically-nearby viewers. Another sharer may only invite viewers associated with users in a corresponding social network. Other types of restrictions are also possible. Further, such restrictions may be placed on an experience-sharing session in scenarios other than during initiation of the experience-sharing session.

In another aspect, the manner in which an experience-sharing session is initiated, and/or what device(s) and/or system(s) are involved in the initiation of an experience-sharing session, may depend on the desired type of experience-sharing session, and possibly other factors as well.

Exemplary initiation procedures will now be described in reference to various session modes, and in particular, to a one-to-one session mode, to a one-to-many session mode, and to a broadcast session mode.

i. One-to-One Session Mode

As stated above, a sharer may initiate a one-to-one experience-sharing session between the sharer and a single viewer. A one-to-one experience-sharing session may be initiated in several ways.

For example, a sharer may initiate a one-to-one experience-sharing session by sending out an invitation to a particular user. Upon receiving an acceptance of the invitation from a viewer associated with the particular user, the sharer may begin a one-to-one experience-sharing session with the viewer.

As another example, a sharer may initiate a one-to-one experience-sharing session and by specifying that only one viewer should be allowed to join the experience-sharing session at a time (without identifying the specific user or viewer that can join). As such, the sharer may set specific criteria to limit the identity of viewers that are allowed to join the one-to-one experience-sharing session, and then accept a viewer that meets the criteria on a first-come first-serve basis. Criteria for the viewer in a one-to-one session may include geographic, demographic, contextual, social-network based, or other user-defined viewer criteria. A viewer may join the experience-sharing session if the viewer meets the criteria set by the sharer and if another viewer is not already viewing the experience-sharing session. As an alternative to pre-setting viewer criteria, the sharer may manually accept viewers by receiving a request from a prospective viewer, presenting the request, and receiving instructions to allow or deny the request.

As yet another example, a sharer may initiate a one-to-one experience-sharing session by sending out an invitation to a viewer, receiving an acceptance of the invitation, and then beginning an experience-sharing session with an assigned session mode of one-to-one. The invitation and the acceptance of the invitation may be in a form which best suits the device type of the viewer. Hence, the invitation may be an e-mail, VoIP message, a micro-blog post, or video conference request if the viewer is a desktop computer, while the invitation may be a voice call, video chat, or text message if the viewer is a cell phone. Many other invitation types may be used depending on the device type of the viewer and/or the preferences set on the sharer.

Alternatively, a prospective viewer may initiate a one-to-one experience-sharing session by sending a prospective sharer a request to initiate an experience-sharing session. Upon receiving acceptance of the invitation, the sharer may begin a one-to-one experience-sharing session with the viewer. As in a sharer-initiated one-to-one experience-sharing session, the invitation in a viewer-initiated one-to-one experience-sharing session may take different forms depending on the device type of the viewer. The sharer may also present the invitation in a variety of ways, which may include displaying of text, pictures and/or graphics; playing a voice message or audio alert; and/or invoking a physical alert (e.g. vibration). The input to accept the invitation may include audio commands received by a microphone or physical sensing from a touchpad, button, actuator, or switch. Alternatively, a sharer may allow a user to prescribe and modify settings to automatically accept or decline experience-sharing session invitations from all or selected prospective viewers.

Another exemplary technique may involve a prospective sharer or a prospective viewer initiating a one-to-one experience-sharing session while engaged in a different form of communication with the other. To elaborate, if a sharer and a viewer (or in a remote implementation: a server and a viewer) each host a communication application, and the communication applications are compatible, an invitation to initiate a one-to-one experience-sharing session may be sent while the viewer and the sharer are already communicatively linked through the communication application. If a prospective sharer sends the invitation, the communication application hosted by the prospective sharer may then receive an acceptance of the invitation and respond to the acceptance of the invitation by initiating a one-to-one experience-sharing session with the viewer. If the prospective viewer sends the invitation within the communication application, the communication application hosted by the prospective sharer may then present the invitation, receive an acceptance of the invitation, and respond to the acceptance of the invitation by initiating a one-to-one experience-sharing session with the viewer.

ii. One-to-Many Session Mode

As indicated previously, a sharer may initiate a one-to-many experience-sharing session between the sharer and one or more viewers. A one-to-many experience-sharing session may be initiated by any of several initiation techniques. Once initiated, the sharer may provide for a viewer or set of viewers to join or leave the one-to-many experience-sharing session.

For example, a sharer may initiate an experience-sharing session and assign the experience-sharing session a session mode of one-to-many, optionally including a maximum allowed number of viewers. Further, the sharer may set specific criteria to limit the identity of viewers that are allowed to join the one-to-many experience-sharing session. Criteria may include geographic, demographic, contextual, social-network based, or other user-defined viewer criteria. A viewer may join the experience-sharing session if the viewer meets the criteria set by the sharer and if the allowed maximum number of viewers has not been reached. As an alternative to pre-setting viewer criteria, the sharer may manually accept viewers by receiving a request from a prospective viewer, presenting the request to a user, and receiving instructions to allow or deny the request.

In another exemplary initiation procedure, a sharer may initiate a one-to-many experience-sharing session by sending out invitations to a set of prospective viewers, receiving at least one acceptance of the invitation, and then beginning an experience-sharing session with an assigned session mode of one-to-many. The invitation and the acceptance of the invitation may be in a form which best suits the device type of each viewer. Hence, one invitation may be an e-mail, VoIP message, micro-blog post, or video conference request if one prospective viewer is a desktop computer, while another invitation may be a voice call, video chat, or text message if another prospective viewer is a cell phone. Upon receipt of an acceptance of an invitation, the sharer may immediately begin a one-to-many experience-sharing session or the sharer may wait for additional acceptances of invitations or for other reasons.

Alternatively, a first prospective viewer may initiate a one-to-many experience-sharing session by sending out a first invitation to a sharer and a set of other invitations to one or more other prospective viewers. The prospective sharer may then present the first invitation and, upon receiving input to accept the invitation, begin a one-to-many experience-sharing session with at least the first prospective viewer. The prospective sharer may also receive an acceptance of an invitation from the set of other invitations. As in a sharer-initiated one-to-many experience-sharing session, the invitations in a viewer-initiated one-to-many experience-sharing session may take different forms depending on the device types of the first prospective viewer and the device types of the other prospective viewers. The sharer may also present the invitation in a variety of ways, which may include: displaying of text, pictures and/or graphics; playing a voice message or audio alert; and/or invoking a physical alert (e.g. vibration). The input to accept the invitation may include audio commands received by a microphone or physical sensing from a touchpad, button, actuator, or switch. Alternatively, a sharer may allow a user to prescribe and modify settings to automatically accept or decline experience-sharing session invitations from all or selected prospective viewers.

Another exemplary technique may involve a prospective sharer or a prospective viewer initiating a one-to-many experience-sharing session while engaged in a different form of communication with the other. To elaborate, if a prospective sharer and a first viewer (or in a remote implementation: a server and a first viewer) each host a communication application, and the communication applications are compatible, a set of invitations to initiate a one-to-many experience-sharing session may be sent while the first viewer and the prospective sharer are already communicatively linked through the communication application. If the prospective sharer sends the set of invitations to the first prospective viewer and other prospective viewers, the communication application being hosted by the prospective sharer may then receive one or more acceptances of an invitation from the set of invitations and respond to the one or more acceptances of an invitation by initiating a one-to-many experience-sharing session. If the prospective viewer sends a first invitation to the prospective sharer and a set of other invitations to other prospective viewers within the communication application, the communication application being hosted by the prospective sharer may then present the first invitation, receive an acceptance of the first invitation, and respond to the acceptance of the first invitation by initiating a one-to-one experience-sharing session with the first prospective viewer. The communication application hosted by the prospective sharer may also receive at least one acceptance of an invitation from the set of other invitations.

Still another exemplary initiation technique for a one-to-many experience-sharing session may involve an existing experience-sharing session, with a session mode other than one-to-many, being modified to become a one-to-many experience-sharing session. For example, the sharer or the original viewer of an existing experience-sharing session with a session mode of one-to-one may send out a set of invitations to other prospective viewers and, in response to the sharer receiving an acceptance of at least one of the set of invitations, modifying the existing experience-sharing session by changing the session mode to one-to-many and continuing the existing experience-sharing session with the original viewer and with other viewers that have accepted one of the set of invitations. Alternatively, the sharer of the existing experience-sharing session with a session mode of one-to-one may, in response to the sharer receiving an acceptance of at least one of the set of invitations, terminate the existing experience-sharing session and begin a new one-to-many experience-sharing session with the original viewer and with other viewers that have accepted one of the set of invitations.

While a one-to-many experience-sharing session continues, the one or more viewers may change in both number and identity. Such changes may occur through a current viewer leaving the one-to-many experience-sharing session or through a prospective viewer joining the one-to-many experience-sharing session.

One exemplary technique for a current viewer to leave a one-to-many experience-sharing session may be sharer-initiated. In a sharer-initiated leaving, a sharer may stop sending the share to a selected viewer either as a result of the sharer receiving instructions from an input device to the stop sending the share to the selected viewer, or as a result of an automated reaction to existing preferences. As an example, a sharer may present a list of current viewers in a one-to-many experience-sharing session, receive a command to discontinue experience sharing with a selected set of viewers, and in response to the command continue the one-to-many experience-sharing session with only viewers not included in the selected set of viewers. Optionally, a sharer may also send a notification to the selected set of viewers to indicate a discontinuation of involvement the one-to-many experience-sharing session.

A second exemplary technique for a current viewer to leave a one-to-many experience-sharing session may be viewer-initiated. A viewer-initiated case may include the sharer receiving an indication that a certain viewer is no longer receiving the share or receiving an indication that the certain viewer no longer wishes to receive the share, and in response to the indication the sharer ceasing transmission of the share to the certain viewer. An unintentional leaving (e.g. connection lost, viewer device turns off, etc.) may also be categorized as viewer-initiated, since a response to an unintentional leaving would likely be similar to that of the viewer-initiated case.

One exemplary procedure for a viewer to join a one-to-many experience-sharing session may be prospective-viewer-initiated. The initiation process may include the sharer of a current one-to-many experience-sharing session: receiving a request from a prospective viewer to participate in the current one-to-many experience-sharing session; receiving an acceptance of the request either from an input device or from an automated process; and, responsive to the acceptance, including the prospective viewer as a viewer in the one-to-many experience-sharing session.

Another exemplary procedure for a viewer joining a one-to-many experience-sharing session may be sharer-initiated. A sharer-initiated experience-sharing session may include a sharer of an existing one-to-many experience-sharing session: sending an invitation to participate in the current one-to-many experience-sharing session to a prospective viewer, receiving an indication that the prospective viewer has accepted the invitation, and in response to the acceptance including the prospective viewer as a viewer in the current one-to-many experience-sharing session.

A third exemplary procedure for a new viewer joining a one-to-many experience-sharing session may be current-viewer-initiated. Such an initiation procedure may include an existing viewer of an current one-to-many experience-sharing session sending an invitation to participate in the current one-to-many experience-sharing session to a prospective viewer; the sharer of the current one-to-many experience-sharing session receiving an indication that the prospective viewer has accepted the invitation; the sharer presenting the indication in the form of a request to participate from the prospective viewer; the sharer receiving an acceptance of the request either from an input device or from an automated process; and, responsive to the acceptance, including the prospective viewer as a viewer in the current one-to-many experience-sharing session.

An exemplary one-to-many experience-sharing session may contain continuance procedures so that the changing characteristics of the one or more viewers may not adversely affect the one-to-many experience-sharing session. For example, a sharer may have initiated a one-to-many experience-sharing session by sending out ten invitations to ten prospective viewers, receiving four acceptances from four prospective viewers, receiving one rejection from one prospective viewer, receiving no indications from five prospective viewers, and beginning the one-to-many experience-sharing session with the four prospective viewers. Later, all of the four prospective viewers may discontinue involvement in the one-to-many experience-sharing session, leaving zero current viewers. A sharer may apply a technique to continue capturing and processing the share, despite the zero current viewers, in anticipation that the sharer may eventually receive acceptances from one or more of the five prospective viewers that were initially unresponsive. Alternatively, a sharer may apply a technique which terminates a one-to-many experience-sharing session with zero current viewers and then initiates a new one-to-many experience-sharing session if the sharer receives an acceptance of an invitation.

Throughout a one-to-many experience-sharing session, the sharer may receive indications of the number and identities of the current set of one or more viewers.

iii. Broadcast Session Mode

A sharer may also initiate an experience-sharing session a share in a broadcast mode, in which the share is broadcast to a website (such as YouTube) where it can be viewed by anyone who is able to access the website. A broadcast experience-sharing session may be initiated by user-input to the sharer, an automated process on the sharer, or transition from an existing non-broadcast experience-sharing session.

The sharer may initiate a broadcast experience-sharing session in response to received user-input. In some embodiments, the sharer may transmit instructions to the website before starting the experience-sharing session to prepare the website for receiving the share. Some procedures may also include the sharer receiving an indication that the website is prepared for the broadcast experience-sharing session before beginning the broadcast experience-sharing session with the website. Additionally, some initiation procedures may include sending notifications to one or more prospective viewers, informing the prospective viewers of the broadcast experience-sharing session. In such procedures, notifications may take many forms including, but not limited to, SMS messages, voice messages, micro-blog posts, video conference requests, voice calls, and/or other types of messages.

If an automated process initiates a broadcast experience-sharing session, an exemplary initiation process may include an application on the sharer responding to a user-defined event and in response presenting an invitation to the sharer to begin a broadcast experience-sharing session. After the sharer receives the invitation from the application, if a positive response is received from an input device, then the sharer may begin a broadcast experience-sharing session with the website. As with the sharer-initiated broadcast experience-sharing session, the sharer may transmit preparation instructions to the website, transmit notifications to prospective viewers, and/or postpone initiation until an indication of readiness is received from the website. In some embodiments, the application may transmit instructions to a website to prepare for a potential broadcast experience-sharing session at the same time that the sharer presents the invitation. In this way, the application may shorten the initiation time by parallelizing the steps of website preparation and receiving an invitation response.

Another exemplary initiation procedure for a broadcast experience-sharing session may involve a sharer modifying an existing experience-sharing session, with a session mode other than broadcast, to create a broadcast experience-sharing session. For example, the sharer of an existing one-to-many experience-sharing session may initiate a sharer-initiated broadcast experience-sharing session, send invitations to the viewers of the one-to-many experience-sharing session to join the broadcast experience-sharing session, and transmit the share to both the sharer-initiated broadcast experience-sharing session and the existing one-to-many experience-sharing session. In some procedures, the sharer may also terminate the existing one-to-many experience-sharing session either as a result of a sufficient number of viewers leaving the existing one-to-many experience-sharing session or as a result of another event (e.g. timer expiration, bandwidth restriction). In a sharer-modified initiation, the sharer may modify the existing experience-sharing session without presenting each step to the HMD, giving the impression that the existing experience-sharing session seamlessly transitioned from one session mode to the broadcast mode.

Once a broadcast experience-sharing session is initiated, the sharer may capture, process, and transmit the share to the website. Prospective viewers may then seek access to the website in order to participate in the broadcast experience-sharing session. Depending on the nature of the website and the preferences on the sharer, the sharer may receive indications about the viewers of the broadcast experience-sharing session.

In addition to general restrictions placed on users by the website, the sharer may send additional criteria to use in limiting which viewers are invited to or allowed to access a broadcast experience-sharing session. Limiting criteria may include geographic, demographic, contextual, social-network based, or other user-defined viewer data.

One deviation from general comment handling procedures in a broadcast experience-sharing session from the general comment handling procedures is that the sharer may receive the comments from the website, as opposed to directly from the viewers. Therefore, the website may rank and filter the comments from the viewers of a broadcast experience-sharing session before transmitting the comments to the sharer, allowing for minimal processing by the sharer or a server. In some embodiments, the website may also present comments from viewers either as indicated by automatic ranking procedures, by viewer ranking, or by input received from the sharer.

The website of a broadcast experience-sharing session may be any website that can receive and display a share. In practice, the website may actually represent multiple websites or web servers. Additionally, an exemplary website may not necessarily handle all portions of a share. For instance, a website configured to present video feeds but not configured to present audio feeds may receive a share consisting only of a video feed. In some embodiments, the sharer of a broadcast experience-sharing session may format the share for the specific website before transmitting the share to the website. In other embodiments, the website may format the share after receiving the share from the sharer. In still other embodiments, the sharer and the website may each format the same share before and after transmission, respectively.

Depending on how the website of a broadcast experience-sharing session is configured, the sharer may receive and display information from the website about the one or more viewers. Exemplary information about the viewers may include the number of viewers currently accessing the broadcast experience-sharing session and the identity of specific viewers. For example, one exemplary embodiment may include the sharer of a broadcast experience-sharing session displaying a number that represents a real-time number of viewers accessing the broadcast experience-sharing session. As another example, the website and sharer of a broadcast experience-sharing session may each host a social networking application in which the sharer is associated with a first user-profile. Then, if one or more of the viewers of the broadcast experience-sharing session are associated with other user-profiles of the social networking application, the website may present the identities of the one or more viewers to the sharer if the first profile is identified to be connected to the other user-profiles.

e. Experience Sharing Website

In a further aspect, an experience-sharing website may aggregate shares from many experience-sharing sessions and provide viewers with a convenient interface for accessing and/or participating in experience-sharing sessions.

In some embodiments, an experience-sharing website may allow users to browse and/or search active experience-sharing sessions (and possibly to browse and/or search an archive of past experience-sharing sessions. Further, to facilitate search functionality, an experience-sharing server may perform indexing of experience-sharing sessions, categorizing of experience-sharing sessions, and other functions to organize the experience-sharing sessions for search.

In some instances, an experience-sharing website may allow a user to view low-resolution versions of multiple shares in a single screen. For example, low-resolution and/or low frame-rate video feeds, or periodic photographs from a sharer's camera, may be presented for a number of shares simultaneously. Other examples are also possible.

In some embodiments, an experience-sharing server may provide access to a certain category or type of experience-sharing session via a "channel" on an experience-sharing website. Such a channel may provide access to a number of experience-sharing sessions having different sharers, which are related in some manner. With access to such a channel, a viewer can more-easily switch between related experience-sharing sessions. Additionally or alternatively, an experience-sharing server may analyze some or all shares on a given channel, and create a combined experience-sharing feed, which may be accessed via an experience-sharing website. The combined feed may show some or all the shares at once, or may intelligently and automatically switch between shares from the channel.

It should be understood that the above-described features of an experience-sharing website are provided for illustrative purposes and should not be construed as limiting.

Commenting Functions in an Experience-Sharing Session

In some embodiments, various features may allow viewers to provide comments during an experience-sharing session. The comments may take the form of, for example, text, graphics (e.g., photos or other graphic objects), audio and/or video. During the experience-sharing session, a wearable computing device may display the comments in a real-time fashion, i.e., comments displayed as they are received. Further, to help more intelligently display comments in the HMD of a sharer, comments may be filtered in real-time by the server and/or the sharer.

In an exemplary embodiment, when a sharer sets up an ESS, the sharer may customize various features related to comments. For example, a sharer may specify the manner in which viewers can provide comments, the manner in which the experience-sharing server will filter, analyze, summarize, and/or format comments, and/or the manner in which the sharer itself will filter, analyze, summarize, display, and/or format comments.

Figure 5A:
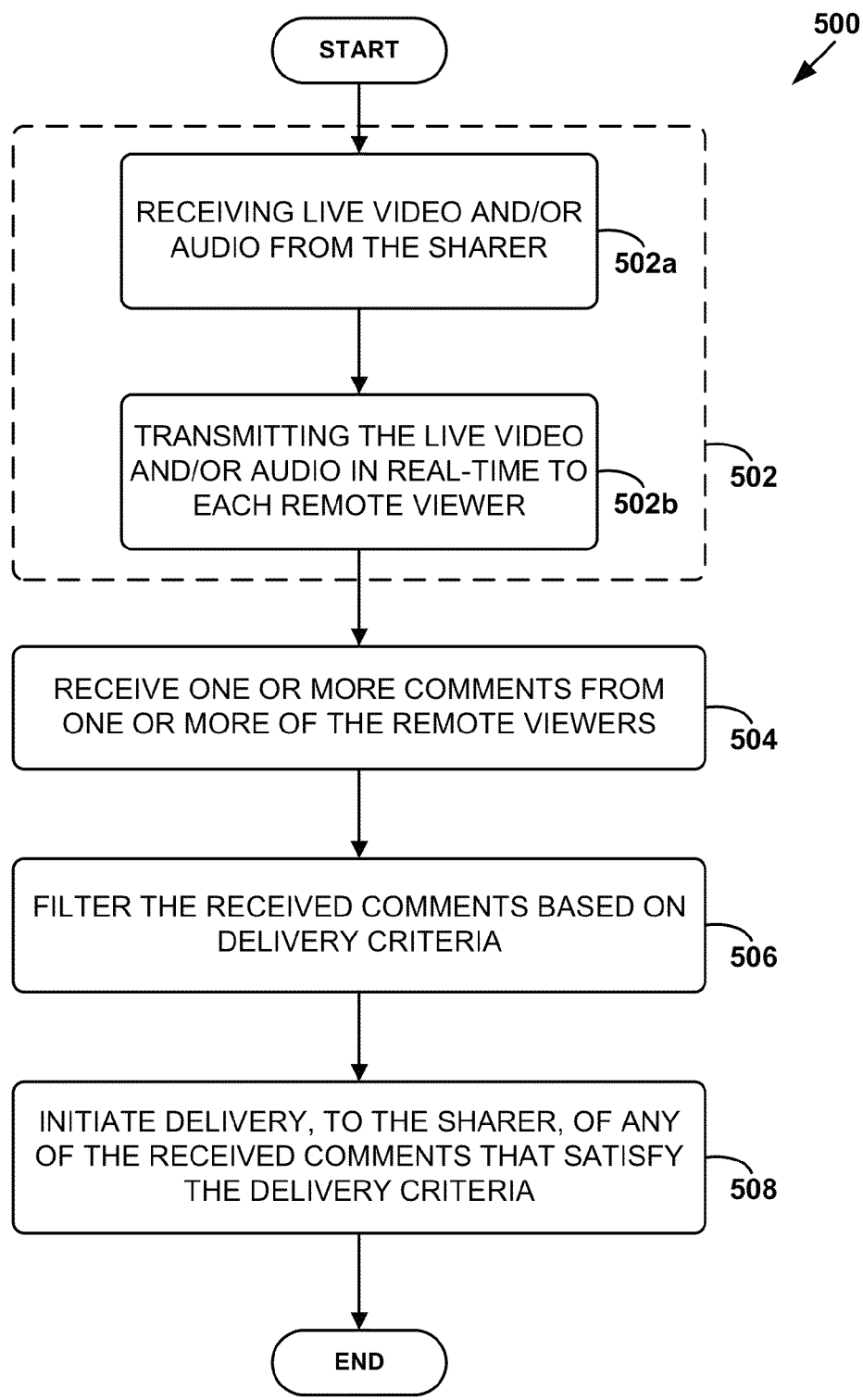
FIG. 5A is a flow chart illustrating a method for filtering comments during an experience-sharing session, according to an exemplary embodiment.

FIG. 5A is a flow chart illustrating a method for filtering comments during an experience-sharing session, according to an exemplary embodiment. Method 500 may be carried out by a server system that is managing and/or controlling an experience-sharing session between a wearable computing device, which is the sharing device, and one or more remote viewers.

More specifically, as shown by block 502, the server system may facilitate an ESS between a wearable computing device acting as a sharer and one or more remote viewers. In particular, facilitating the ESS may involve receiving live video and/or audio from the sharer, as shown by block 502a, and transmitting the live video and/or audio in real-time to each of the remote viewers, as shown by block 502b. At some point during the ESS, the server system receives one or more comments from one or more of the remote viewers, as shown by block 504. The server system may then filter the received comments based on delivery criteria, as shown by block 506. The server system may then initiate delivery, to the sharer, of any of the received comments that satisfy the delivery criteria, as shown by block 508.

In a further aspect, the server system may filter the received comments and/or deliver those comments satisfying the delivery criteria in real-time; i.e., comments are filtered and delivered as they are received.

a. Receiving Comments at the ESS Server

In an exemplary embodiment, a server system may be configured to receive and deliver various different types of comments. For example, the comments may include various types of media such as text, graphics, audio and/or video, among others. Further, exemplary viewers may be configured to create the various different types of comments, and send the various types of comments. Yet further, an exemplary wearable computing device, acting as a sharer, may be configured to receive and display or play out the various different types of comments.

In some embodiments, the comments may be an indication of a certain action by the viewer. For example, if an ESS involves a poll, comments may take the form of a vote for a particular selection or particular selections from a number of possible selections provided by the poll.

Further, while comments may be visual (e.g., text, graphics, and video), comments may also be audible. For example, a comment may include speech captured by a viewer. As another example, a comment may include synthesized speech that is generated by the experience-sharing server or by a viewer.

In a further aspect, the fact that a viewer is participating in an ESS may itself be interpreted as a comment. For example, each viewer's participation contributes to the total number of viewer's that are participating. The total number may then be displayed as, for example, an interest meter, which may provide a graphic indication of the ESS's popularity (e.g., a thermometer graphic that increases in "temperature" as the number of viewers increases).

In a further aspect, comments may be received in various ways. For example, an experience-sharing website may provide a UI for comments. As such, a viewer may access the website, and provide comments during an ESS in which the viewer is participating. As another example, a dedicated experience-sharing application may provide a UI for comments. A viewer such as a smart phone, tablet, desktop computer, laptop computer, or another wearable computing device may then provide comments via the UI of the experience-sharing application.

b. Ranking and/or Filtering the Comments

In some embodiments, the experience-sharing server may relay all the comments that it receives during an ESS to the sharer. In some cases, however, it may be impractical or undesirable to display all of the comments. This may occur, for example, if the comments become too numerous to be conveniently displayed or if the wearer of the wearable computing device does not want to be distracted. Accordingly, in some embodiments, the experience-sharing server may filter comments as they are received, so that comments may be selectively sent to the sharer.

i. Server-Based Ranking and/or Filtering of Comments

The experience-sharing server may employ various techniques to rank and/or filter comments. For instance, as shown by block 506 of FIG. 5A, the experience-sharing server may filter comments based on certain delivery criteria. For example, the delivery criteria may specify a rating system by which comments can be quantitatively rated. Further, the delivery criteria may specify a threshold rating to which the rating of a given comment can be compared. Comments with ratings that exceed the threshold rating may be deemed to satisfy the delivery criteria.

Alternatively, the delivery criteria may specify a number of comments that should be delivered at a given point in time. For example, the delivery criteria may indicate that the experience-sharing server should deliver three comments at a time during the ESS. Accordingly, the experience-sharing server may rank comments that are received, and deliver the three highest-ranking comments. Further, the experience-sharing server may update the rankings as more comments are received, and if the top three comments change, then the experience-sharing server may send the updated top-three comments. The sharer may then replace the three previously delivered comments with the updated top-three comments.

According to an exemplary embodiment, the delivery criteria may specify how to apply on one or more factors in ordering to determine a ranking for comments. Such factors may include: (a) viewer voting for comments (e.g., viewers in an ESS voting for display of or "liking" another viewer's comment), (b) the content of the comment itself (e.g., ranking based on keyword searches of text or analysis of image that indicates how important a comment is important to the sharer), (c) the identity of the viewer from which the comment was received (e.g., ranking base on whether the remote viewer is in the user's social network, the remote viewer's approval rating by other viewers and/or the sharer, etc.), (d) one or more contextual or demographic characteristics of the remote viewer (e.g., ranking based on gender, age ranges), (e) the geographic location of the remote viewer (e.g., how close the remote viewer is to the user of the wearable computing device), and/or (f) other factors.

In a further aspect, ranking of comments may be based on the recency of the respective comments (e.g., with more recent comments tending to be ranked higher than less recent comments). As such, the delivery criteria may indicate a decay factor to employ when ranking comments. For example, the decay factor may be used to reduce the ranking of older comments as compared to more-recent comments.

In yet a further aspect, the delivery criteria that are employed may also be context-dependent. In particular, the manner in which comments are ranked and/or selected for delivery may vary based on the context of the sharer (which the sharer may periodically determine and send to the experience-sharing server). For example, if a sharer's context is "at work," then one set of delivery criteria may be used to filter comments (e.g., prioritizing comments from co-workers over friends and family). However, if the same sharer's context is "at home," then a different set of delivery criteria may be used to filter comments (e.g., prioritizing comments from friends and family over co-workers).

In some embodiments, the delivery criteria may be created, adjusted and/or removed by the sharer. As such, an exemplary wearable computing device may provide a UI that allows user to select how comments are filtered.

In another aspect, comments that do not satisfy the delivery criteria may be stored for subsequent delivery or review. In particular, stored comments may be ranked again at a later time, when it is possible that their ranking may have increased, or may be relatively higher (e.g., when the other comments being ranked have lower rankings than the comments that were ranked at the time the given comment was stored).

In an alternative embodiment, comments may be ranked and delivered to the sharer with an indication of the associated ranking. In such an embodiment, the sharer may then determine which comments to display.

Further, in some embodiments, the ESS may forward all comments to the sharer, which may then determine which comments should be displayed. For instance, the sharer may apply its own filter criteria to determine which comments to display.

In yet another aspect, an experience sharing server, a sharer, and/or a viewer may be configured for threading of comments in an ESS. As such, comments may be displayed as threads, which are grouped by subject, for example.

Further, in some applications, the comments in an ESS may serve as a conversation among viewers that is hidden from the sharer (e.g., a chat session that is private to the viewers, or possibly to a subset of the viewers). In such embodiments, threading may be used to create a conversation from received comments.

As a specific example, an exemplary method may be used to facilitate a real-time chat session as part of the experience-sharing session. In particular, as a server system receives comments in an ESS, the server system may determine a conversational relationship between the comments. For instance, whenever a comment is received the server system may determine whether the comment is related to past comments by analyzing such factors as (a) whether the comment is a reply to a previous comment, (b) whether the comment was received via a chat-room user-interface, (c) whether the context of the comment is the same as or relates to a previous comment, and/or (d) whether the language of the comment explicitly or implicitly indicates a relationship to a previous comment. Other factors may also be analyzed to determine the conversational relationship between a given comment and a previous comment or comments.

Once the conversational relationship is determined, the serving system may send data that indicates the conversational relationship to the sharing device. As such, the sharing device can then display of the received comments based on the conversational relationship. For example, a wearable computer may display a conversation window, which includes a certain number of the most-recent comments in a conversation, in an HMD of the wearable computer.

Additionally or alternatively, the serving system may send data that indicates the conversational relationship to one or more viewing devices in an ESS. A viewing device that receives such conversational-relationship data may then display a conversation window, for example, which includes a certain number of the most-recent comments in the conversation. Further, the serving system may send the conversational-relationship data and the comments in the conversation at the same time as or in conjunction with sending the real-time video from the sharing device. As such, the viewing device may display the video and the conversation concurrently and in real-time.

ii. Sharer-Based Ranking and/or Filtering of Comments

Ranking and/or filtering may also be performed by a wearable computing device that is functioning as a sharer in an ESS. In particular, the sharer may apply certain display criteria to comments that are received from the experience-sharing server, in order to select which comments should be displayed. The sharer may then display in real-time (e.g., on an HMD of the sharer) any comments that satisfy or are selected based on the display criteria.

Figure 5B:
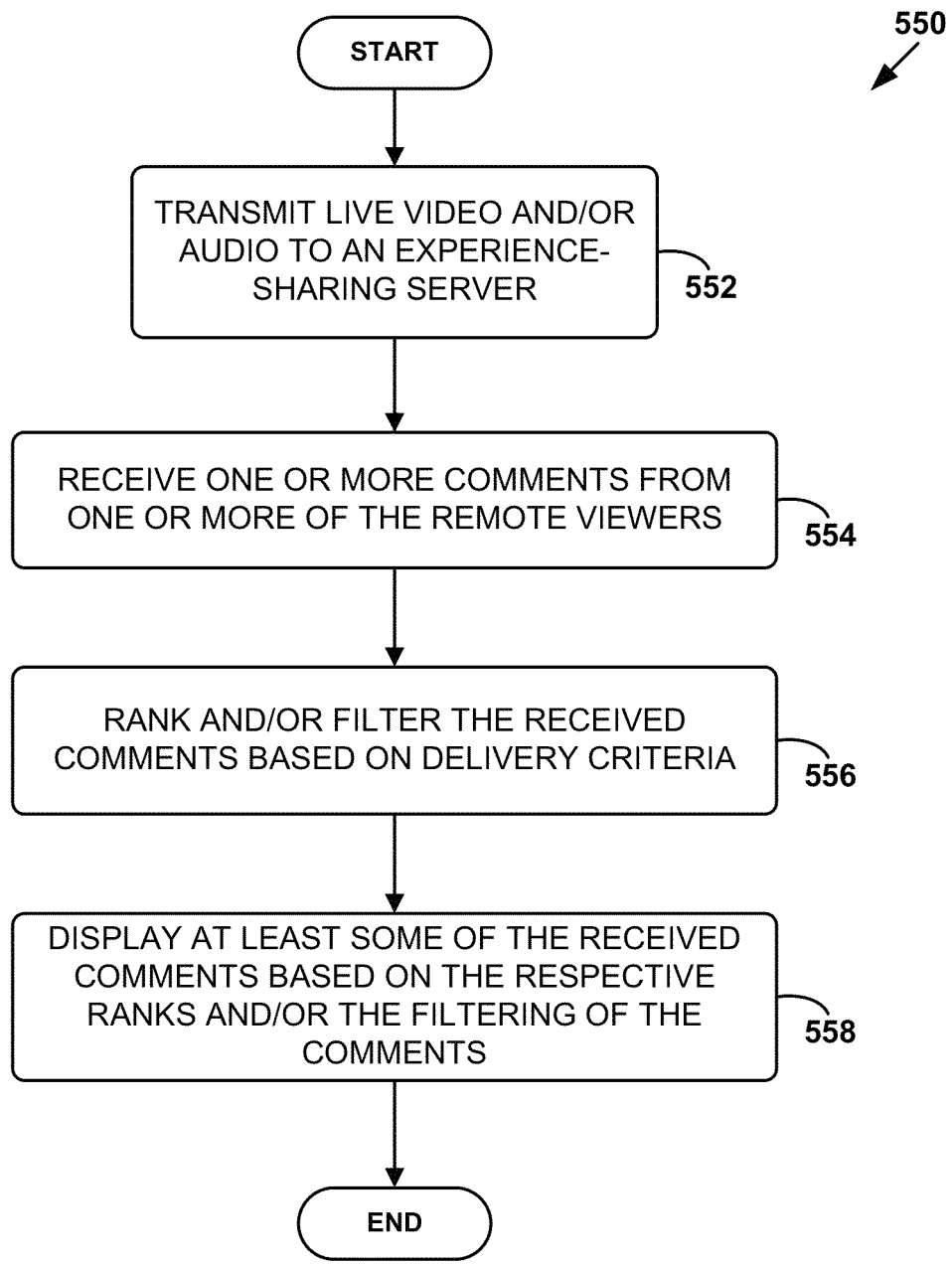
FIG. 5B is a block diagram illustrating a method for ranking and displaying comments, which may be carried out by a sharer device, according to an exemplary embodiment.

FIG. 5B is a block diagram illustrating a method for ranking and displaying comments, which may be carried out by a sharer device, according to an exemplary embodiment. As shown, method 550 involves the sharer engaging in an ESS by transmitting live video and/or audio to an ESS, as shown by block 552. At some point during the ESS, the sharer receives one or more comments from one or more of the remote viewers in the ESS, as shown by block 554. The received comments may or may not have been filtered and/or ranked by the ESS, prior to receipt. In either case, the sharer may then rank and/or filter the received comments based on delivery criteria, as shown by block 556. The sharer may then display at least some of the received comments based on the respective ranks and/or the filtering of the comments, as shown by block 558.

In some embodiments, the sharer may apply display criteria to further filter comments that have already met the delivery criteria used by the experience-sharing server. In other embodiments, the experience-sharing server may not apply delivery criteria. In such embodiments, the sharer may apply display criteria to comments that have not yet been filtered. Further, it is also possible that the sharer does not filter the comments that are delivered (i.e., that the sharer simply displays the comments that the experience-sharing server indicates should be displayed).

In some embodiments, the sharer may apply display criteria that specify a rating system by which comments can be quantitatively rated. Further, the display criteria may specify a threshold rating to which the rating of a given comment can be compared. Comments with ratings that exceed the threshold rating may therefore be deemed to satisfy the display criteria.

Alternatively, the display criteria may specify a number of comments that should be displayed at a given point in time. For example, the delivery criteria may indicate that the sharer should display three comments at a time in the HMD. Accordingly, the sharer may rank comments that are delivered, and display the three highest-ranking comments. Further, the sharer may update the rankings as more comments are delivered, and if the top three comments change, then the share may replace the three previously displayed comments with the updated top-three comments.

According to an exemplary embodiment, the display criteria may specify how to apply on one or more factors such as: (a) viewer voting for comments (e.g., viewers in an ESS voting for display of or "liking" another viewer's comment), (b) the content of the comment itself (e.g., based on keyword searches of text or analysis of image that indicates how important a comment is important to the sharer), (c) the identity of the viewer from which the comment was received (e.g., whether the remote viewer is in the user's social network, the remote viewer's approval rating by other viewers and/or the sharer, etc.), (d) one or more contextual or demographic characteristics of the remote viewer (e.g., gender, age ranges), (e) the geographic location of the remote viewer (e.g., how close the remote viewer is to the user of the wearable computing device), (f) and/or other factors.

In a further aspect, the display criteria may indicate a decay factor to employ when ranking comments. For example, the decay factor may be used to reduce the ranking of older comments as compared to more-recent comments.

In yet a further aspect, the display criteria that are employed may also be context-dependent. In particular, the manner in which comments are ranked and/or selected for delivery may vary based on the context of the sharer (which the sharer may periodically determine and send to the experience-sharing server).

In some embodiments, the display criteria may be created, adjusted and/or removed by the sharer. As such, an exemplary wearable computing device may provide a UI that allows a user of the sharing device to select how comments are filtered.

In another aspect, comments that do not satisfy the display criteria may be stored by the sharer (or sent to the experience-sharing server or elsewhere for storage) for subsequent review and/or display. In particular, stored comments may be ranked again at a later time, when it is possible that the comments' respective rankings may have increased, or may be relatively higher (e.g., when other comments that are currently being ranked have lower rankings than the comments that were ranked at the time the given comment was stored). Furthermore, changes in context may cause the ranking of a given comment to change, as the relevance of a comment may increase or decrease depending on the context. The ranking of a comment may change for other reasons as well.

Further, comments may be stored so that they can be included when an ESS is replayed at a later time. To facilitate this functionality, comments may be associated with a particular point in a share (e.g., by time-stamping each comment). As such, when the ESS is replayed, the comments may be displayed at the same time in the share as they were in the ESS originally took place.

c. Displaying Comments to the Sharer

When wearing an HMD, information may be presented in a relatively small display. Accordingly, in some embodiments, comments from various viewers may be compiled and displayed as, for example a ranked list of comments. For example, FIG. 6 is an illustration of an HMD displaying comments, according to an exemplary embodiment.

In particular, HMD 600 may be a sharer in an ESS, and accordingly may display comments from viewers in the ESS in a comment field 602 of the HMD's display 604. As shown, the comments may be displayed as a list 606 in comment field 602. List 606 may be ordered according to the ranking of comments, or may be ordered based on other criteria.

Figure 6:
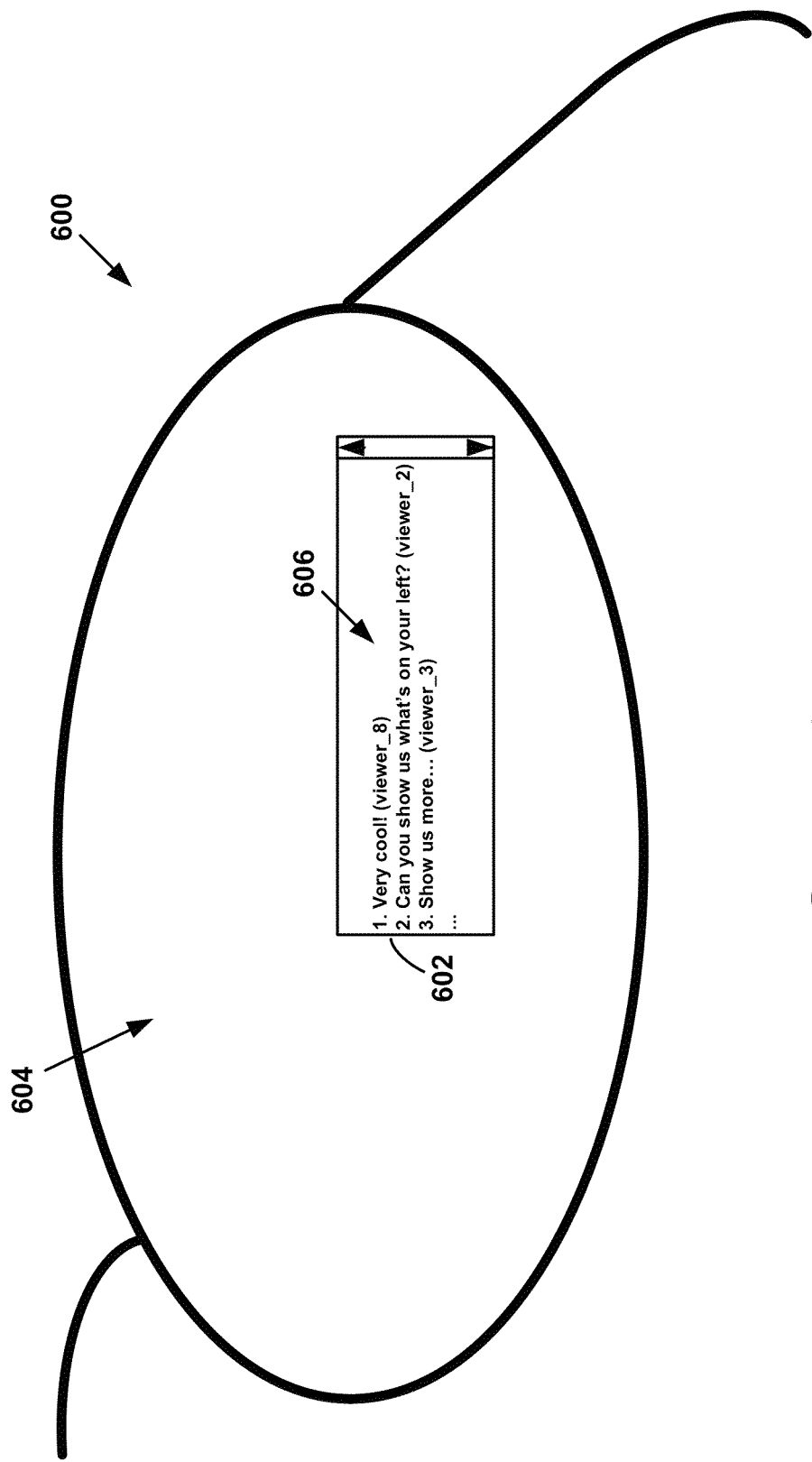
FIG. 6 is an illustration of a head-mounted display displaying comments, according to an exemplary embodiment.

In the example illustrated in FIG. 6, each comment in list 606 may include an indication of the viewer from which the respective comment was received, such as the viewer's name or a user name of the viewer that provided the comment. For example, a viewer having the user name "viewer_8" provided the comment "Very cool!" and the viewer having the user name "viewer_3" provided the comment "Can you show us what's on your left"

In some instances, the sharer device and/or the ESS may process comments for display so that condensed version or a summary of some or all comments may be displayed. For example, comments may be categorized, so that an indication of the total number of comments in a certain category can be displayed. As a specific example, the text of comments may be analyzed to determine if each comment is favorable or unfavorable as to a certain event in an ESS. The HMD may then display an indication of the total number of favorable comments and/or the total number of unfavorable comments.

In a further aspect, when comments are aggregated or compiled, and the HMD displays a condensed version of the comments, the comment aggregation may be based on certain keywords or on certain user preferences. Accordingly, the sharer may define such keywords and/or set such user preferences, in order to specify how the comments appear in the HMD.

Figure 7:
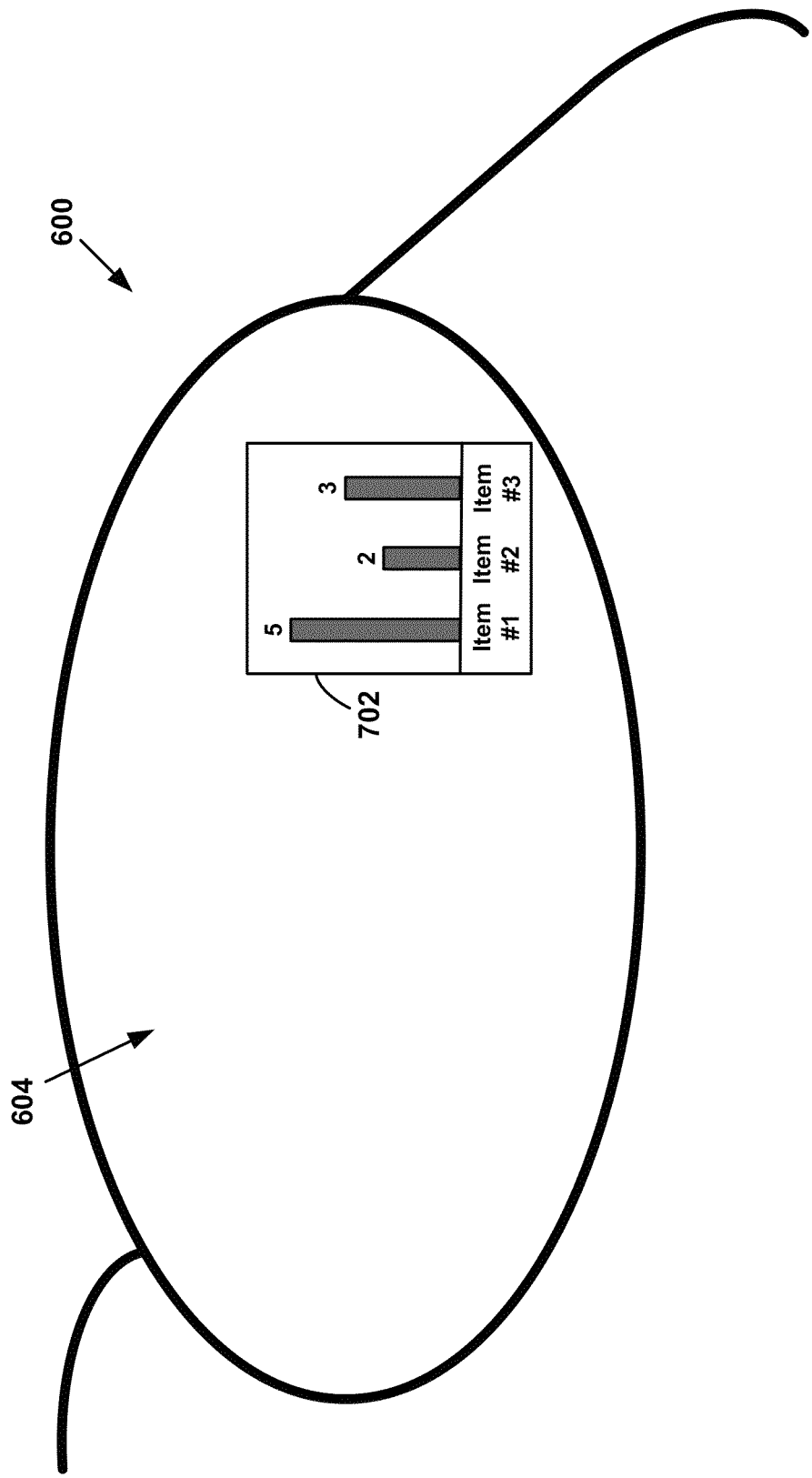
FIG. 7 is another illustration of a head-mounted display displaying comments, according to an exemplary embodiment.

As another example of compiling comments, FIG. 7 is another illustration of an HMD displaying comments, according to an exemplary embodiment. In FIG. 7, comment field 702 is displayed in the display 604 of HMD 600. As shown, comment field 702 includes a graphic representation of comments that take the form of votes in a poll. More specifically, a sharer may have created a poll that has three options: "item #1," "item #2," and "item #3." As such, comment field 702 is graphic representation of nine votes in this poll. As shown in comment field 702, five of the votes have been for item #1, two of the votes have been for item #2, and three of the votes have been for item #3.

In a further aspect, comments may be formatted for display by the ESS and/or by the sharing device. For example, if a comment includes a picture, a thumbnail of the picture may be created for display in the comment field. The thumbnail may then be selected by the sharer in order to access a full-size version of the picture. As another example, if a comment includes a video, a screenshot of the video may be created for display in the comment field. The screenshot may then be selected by the sharer in order to access a full video. Other examples are also possible.

In another aspect, comments may be displayed in real-time as they are received, or as they meet display criteria. Alternatively, comments may be stored and displayed at a later time during the ESS. For example, a stored comment may be displayed in response to detecting a certain event in an ESS.

As a specific example, consider the scenario where a sharer creates a share for a visit to a museum. In this share, a viewer may tag a certain comment to indicate that the comment relates to a given work of art in the museum. When the sharer receives the comment tagged for the given work of art, the sharer may store this comment. Then, at a later time, the sharer may then determine that the sharer is near the given work of art by, for example, identifying the work of art in a POV video feed from the HMD and/or detecting an RFID or NFC tag associated with the work of art. Accordingly, the HMD may retrieve and display the comment that is tagged for the given work of art. Many other specific examples are also possible.

In some cases, the sharer may be able to act on comments from viewers. For example, the sharer may be able to interact with content included in comments such as hyperlinks (e.g., by opening the URL associated with a hyperlink), video and/or audio (e.g., by playing or storing the video and/or audio), and pictures (e.g., by viewing the pictures in a picture viewer).

d. Requesting Comments

In an exemplary embodiment, a sharer may request or solicit comments during an ESS. In some instances, the sharer may request comments related to a certain event or certain portion of an ESS. In other instances, however, the sharer may solicit general comments from viewers, without necessarily tying the request to any particular event or portion of the share.

In a further aspect, a sharer may be configured to request comments from a viewer or viewers during an ESS. For example, if the sharer is leading an ESS for a shopping trip to purchase new clothes, the sharer may select a shirt they like and request opinions from viewers regarding the shirt. Many other examples are also possible.

A request for comments may be initiated in various ways. In some cases, the sharer may provide a UI via which a user can describe the type of feedback desired in comments. For example, the user may speak a predetermined phrase (e.g., "please comment") followed by a description of the type of feedback desired (e.g., "what is your opinion on this shirt"). The wearable computer or the experience-sharing server may analyze this statement (possibly by applying speech-to-text and analyzing the text), and responsively send viewers an indication of the request for comment.

As another example, the sharer may provide a UI via which a user can identify an item on which feedback is required. For instance, a wearable computer may display crosshairs or another icon that can be located over the wearer's view of an object so that the object can be selected for feedback. When the object is selected, the experience-sharing server may add graphics identifying the object and/or indicating the object has been selected for comment to POV video feed to the viewers, so that the viewers understand that comments on the object have been requested.

The function of requesting comments may be useful in many implementations. Generally, this function may be useful in any embodiment where the sharer is being provided with instructions or directions from one or more viewers. For instance, as a user of a sharing device is driving to a destination, the sharing device may provide a UI via which the user can initiate requests for directions at various junctions where the user unsure where to turn. This function may be useful in other implementations as well.

In a further aspect, a sharer or experience-sharing server may automatically generate prompts for comments upon detection of certain trigger events in an ESS. For example, continuing the above example of an ESS where a viewer is providing the sharer with driving directions, each time the experience-sharing server and/or the sharer determines that the sharer has successfully completed a step in the directions (e.g., correctly making a right or left turn, or correctly taking a certain highway exit), the viewer may be prompted to provide the next step in the driving directions. Many other examples are also possible.

e. Replying to and Classifying Comments

In a further aspect, a sharer may reply to comments from viewers. For example, a sharer may select a comment, generate a reply comment to the selected comment, and then send the reply comment to the experience-sharing server. A reply comment may include: (a) an indication of the original comment that is being replied to (e.g., a comment ID number), (b) an indication of the viewer from which the original comment was received, (c) an indication of a viewer or viewers to which the reply comment should be directed (which may or may not include the viewer from which the original comment was received), (d) an indication of the ESS in which the original comment was received (e.g., an ESS ID number), (e) the type and/or substance of the reply comment, and/or (f) other information related to the reply comment.

To facilitate reply-comment functionality, an ES receiver may be configured to receive a reply comment from a sharer. As noted, the reply comment may identify the original comment that is being replied to (e.g., by a comment ID number), the viewer from which the original comment was received, a viewer or viewers to which the reply comment should be directed (which may or may not include the viewer from which the original comment was received), the ESS in which the original comment was received, and/or the type and/or substance of the reply comment.

The experience-sharing server may be further configured to send a reply comment to the appropriate viewer or viewers. In some embodiments, the experience-sharing server may apply filter criteria to the reply comment and/or may rank the reply comment. In such an embodiment, the experience-sharing server may or may not send the reply comment to a viewer, depending upon whether the reply comment is filtered out and/or ranked high enough to be sent on to the viewers. In other embodiments, however, the experience-sharing server may simply forward reply comments to the appropriate viewers, without filtering and/or without ranking the reply comments.

In some embodiments, a sharing device may allow a user of a sharing device to classify a comment. For example, a sharing device may select a particular comment and label the comment as being of a particular type (e.g., by associating a certain keyword or keywords with the comment). Many other examples of classification are also possible As one additional example, a sharing device may allow a user to classify a comment as being helpful or unhelpful. The experience-sharing server and/or the sharer may then use the fact that a comment was classified as helpful (or otherwise classified in a positive manner) to more intelligently filter comments during the ESS. For example, comments by a particular viewer may be ranked more highly if previous comments from the viewer were found helpful. As another example, the experience-sharing server and/or the sharer may analyze the helpful comment and identify other comments that are similar to, relate to, and/or build upon the helpful comment. Such comments may then be ranked more highly than they otherwise would be.

On the other hand, comments that are similar to, relate to, and/or build upon a comment that is classified as unhelpful (or that is otherwise classified in a negative manner) may be treated in a less favorable manner than they otherwise would be. Further, a comment that is classified as unhelpful may be removed from the display on the sharer or have its ranking decreased. Other types of comment classification functions are possible as well.

Figure 8:
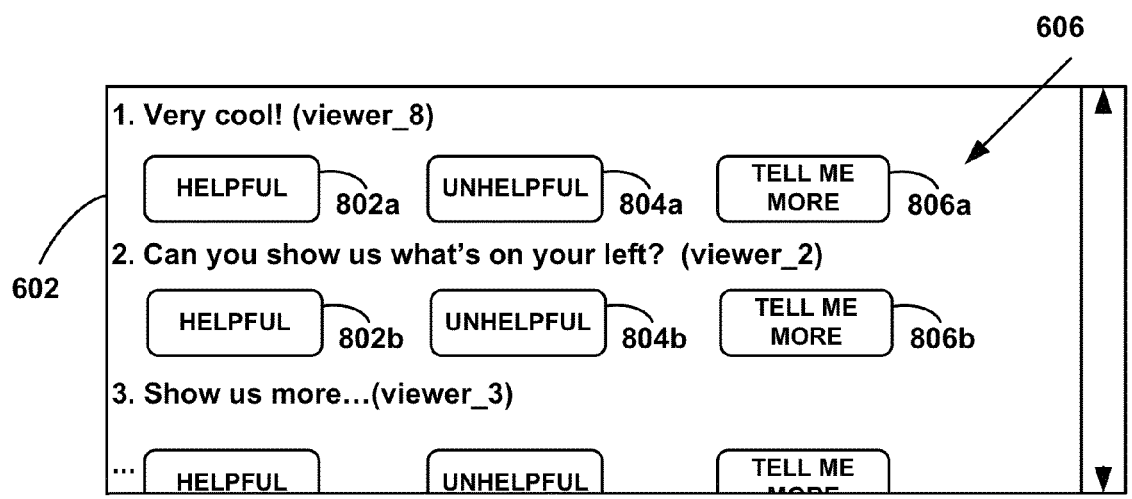
FIG. 8 is a block diagram illustrating the comment field of FIG. 6 in greater detail.

In some embodiments, a sharer may provide a UI that allows for certain predetermined reply comments to be initiated and/or that allows for comments to be classified using certain predetermined criteria. For example, FIG. 8 is a block diagram illustrating the comment field 602 of FIG. 6 in greater detail. As shown, comment field 602 includes buttons that when selected, may classify or generate an automated reply comment to a comment from list 606.

More specifically, each comment in comment field 602 includes a "HELPFUL" button, an "UNHELPFUL" button, and a "TELL ME MORE" button. For example, the "Very cool!" comment includes HELPFUL button 802a, UNHELPFUL button 804a, and TELL ME MORE button 806a. Similarly, the "Can you show us what's on your left?" comment includes HELPFUL button 802b, UNHELPFUL button 804b, and TELL ME MORE button 806b.

Selecting one of the HELPFUL buttons 802a, 802b may classify the respective comment as being helpful. Similarly, selecting one of the UNHELPFUL buttons 804a, 804b may classify the respective comment as being unhelpful.

Further, selecting one of the TELL ME MORE buttons 806a, 806b may initiate a predetermined type of reply comment. For example, if TELL ME MORE button 806b is selected, then a reply comment may be sent to viewer_2 which identifies the original comment "Can you show us what's on your left?" and/or indicates that the sharer would like additional details or elaboration on the original comment.

f. Displaying Comments to Viewers

A viewer in an ESS may also display comments. In some instances, a given viewer may only display their own comments. However, in other instances, viewers may see their own comments and comments from other viewers and/or the sharer. For example, a viewer may display comments from a group of viewers that includes the given viewer, or may simply display all comments from all viewers.

Further, in an embodiment where the sharer can reply to viewer comments or solicit comments from viewers, a viewer may only see replies and/or solicitations that are specifically directed to that viewer (or only see those that are directed to a group of viewers that includes the viewer). However, in other cases, a viewer may simply display all reply comments and/or solicitations for comments from the sharer.

In a further aspect, a viewer may display the exact same comments that are displayed by the sharer during an ESS. However, a viewer may also display different comments and/or differently-formatted comments than those that are displayed by the sharer in an ESS. In order for a viewing device to display different comments than are displayed by the sharing device, the experience-sharing server may apply different filter criteria for viewer than for the sharer. Additionally or alternatively, the viewer may itself apply display criteria, which may be the same as or different from any display criteria applied by the sharer, in order to filter received comments.

Note that the filter criteria and/or the display criteria for a viewer may incorporate some or all of the same factors as those factors described in reference to the filter criteria and/or the display criteria for the sharer. However, in the event that the viewer displays different comments and/or formats comments in a different manner from the sharer, the same above-described factors may be applied in a different manner for the viewer.

In a further aspect, different filter criteria and/or different display criteria may be applied for different viewers in the same ESS. For instance, two different sets of filter criteria may be applied for two different types of viewers (e.g., viewers that are part of the sharer's social network may see an expanded set of comments, as compared to viewers that are not part of the sharer's social network). Further, in some cases, customized filter criteria and/or display criteria may be defined for a particular viewer. Such customized criteria may be created for and/or assigned to the particular viewer by the sharer and/or by the particular viewer. Yet further, it is of course possible that the same filter criteria and/or the same display criteria may be applied for all viewers in an ESS.

In some embodiments, individual viewers may also be able to set criteria for ranking and/or filtering comments in ESS. Typically, a viewer may use similar techniques to set criteria as described in reference to a sharer doing the same.

In yet another aspect, a viewer may be able to comment on another viewer's comments. Further, when viewers comment on other viewer's comments, a comment thread may be created. This feature may be applied, for example, in an ESS where viewers have a private chat room.

Use of Context in Exemplary Methods and Systems

Various aspects described herein involve the use of context. Generally, context may be determined based on one or more "context signals." Accordingly, a given system or device may be configured to determine various context signals and/or to acquire context signals from other sources. Further, the given system or device may be configured to determine a context based on the determined context signals.

A context signal may be any signal that provides a measurement of or otherwise provides information pertaining to the state or the environment associated with a certain subject (e.g., with a certain person, device, event, etc.). Many types of information, from many different sources, may be used as context signals or provide information from which context signals may be determined. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information, (bb) a current location, (cc) a past location, and (dd) a future location. Those skilled in the art will understand that the above list of possible context signals and sources of context information is not intended to be limiting, and that other context signals and/or sources of context information are possible in addition, or in the alternative, to those listed above.

Some context signals may take the form of discrete measurements. For example, a temperature measurement or a current GPS location may be used as a context signal. On the other hand, context signals may also be determined or measured over time, or may even be a continuous signal stream. For instance, an exemplary device may use the current volume of a continuous audio feed from an ambient microphone as one context signal, and the volume of a continuous audio feed from a directional microphone as another context signal.

In some embodiments, a "context" may be defined by values of one or more context signals. Alternatively, a context may be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For instance, context signals indicating that that it is 6:30 AM on a weekday and that a user is located at their home may be used to determine the context that the user is "getting ready for work."

It should be understood that the above-described examples of context signals and contexts are provided for illustrative purposes and should not be construed as limiting. Many other examples of context signals and contexts that can be derived therefrom are also possible.

CONCLUSION

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A computer-implemented method comprising:
   a server system facilitating an experience sharing session between a sharing device and one or more viewing devices, wherein facilitating the experience sharing session comprises receiving a share in real-time from the sharing device and transmitting at least a portion of the share to the one or more viewing devices in real-time, wherein the share comprises video, wherein the sharing device comprises a head-mountable device (HMD), and wherein the share is based on point-of-view video captured at the HMD;
   during the experience sharing session:
      the server system receiving a plurality of comments associated with the share, wherein the plurality of comments are received from one or more of the viewing devices;
      determining a context of the sharing device based on one or more context signals, wherein each of the one or more context signals provides information pertaining to a state or an environment of the sharing device;
      based at least in part on the context of the sharing device, the server system determining filter criteria that corresponds to the context;

the server system filtering the received comments in real-time based on the determined filter criteria, wherein the filtering comprises: (a) determining a respective rating for each received comment according to the determined filter criteria and (b) determining a first ranking of the received comments based on the respective ratings of the received comments; and the server system initiating real-time delivery, to the sharing device, of one or more of the highest-ranking received comments indicated by the first ranking; and at a later time during the experience sharing session, the server system:
(a) determining a second context of the sharing device, wherein the second context is different from the previously determined context;
(b) in response to determining the second context that differs from the previously determined context, the server system updating the filter criteria;
(c) using the updated filter criteria as a basis for determining a second respective rating for each received comment and for any comment received subsequent to the real-time delivery of one or more of the highest-ranking received comments indicated by the first ranking;
(d) determining a second ranking of the fated comments rated using the updated filter criteria based on the respective second ratings of the fated comments rated using the updated filter criteria; and
(e) initiating real-time delivery, to the sharing device, of one or more of the highest-ranking comments indicated by the second ranking.

2. The method of claim 1, wherein the server system filtering the received comments based on filter criteria comprises:
the server system determining a rating of a received comment from a particular viewing device;
the server system comparing the rating of the received comment to a threshold rating; and
the server system determining that the received comment satisfies the filter criteria if the rating exceeds the threshold rating.

3. The method of claim 2, wherein the rating of the received comment is based, at least in part, on one or more of the following: (a) audience voting, (b) content of the received comment, (c) an identity of the particular viewing device, (d) a geographic location of the particular viewing device, (e) one or more user-defined parameters, (f) recency of the received comment.

4. The method of claim 1, further comprising the server system storing any of the received comments that do not satisfy the filter criteria.

5. The method of claim 1, further comprising:
the server system generating a comment summary based on one or more of the received comments; and
the server system initiating sending the comment summary to the sharing device.

6. The method of claim 1, further comprising:
the server system determining that two or more of the received comments that satisfy the filter criteria are related; and
the server system threading the two or more related comments before initiating delivery of the two or more related comments to the sharing device.

7. The method of claim 1, wherein the server system implements the method of claim 1 to facilitate a real-time chat session as part of the experience-sharing session, the method further comprising:

determining a conversational relationship between two or more of the received comments and;
sending data that indicates the conversational relationship to the sharing device for display of the two or more of the received comments based on the conversational relationship.

8. The method of claim 1, wherein the one or more of the received comments are stored, the method further comprising:
the server system detecting a trigger event that corresponds to a given one of the stored comments; and
in response to the trigger event, the server system sending the given stored comment to the sharing device.

9. The method of claim 1, further comprising:
the server system receiving a request for comment from the sharing device;
the server system sending the request for comment to one or more of the viewing devices; and
the server system implementing the method of claim 1 to filter and send to the sharing device comments that are received from one or more of the viewing devices in response to the request for comment.

10. The method of claim 9, wherein the request for comment indicates a subject or event, and wherein filtering the received comments in real-time based on filter criteria comprises identifying any comment that relates to the indicated subject or event.

11. The method of claim 1, wherein the filter criteria used to filter the comments comprises first filter criteria, the method further comprising:
the server system receiving one or more comments from the sharing device;
the server system filtering the received comments from the sharing device in real-time based on second filter criteria; and
the server system initiating delivery, to one or more of the viewing devices, of one or more of the received comments from the sharing device that satisfy the second filter criteria.

12. The method of claim 11, wherein the second filter criteria is different from the first filter criteria.

13. The method of claim 11, wherein the second filter criteria indicates different filtering for each of at least two viewing devices.

14. The method of claim 1, wherein determining filter criteria that corresponds to the context comprises selecting one of a plurality of ranking criteria based on the context associated with the sharing device, wherein each of the plurality of ranking criteria provides criteria for ranking the plurality of comments.

15. The method of claim 1, wherein the context of the sharing device corresponds to an activity of a user of the sharing device, and wherein the determined filter criteria corresponds to the activity.

16. The method of claim 1, wherein the context of the sharing device corresponds to a current geographic location of sharing device, and wherein the determined filter criteria corresponds to the current geographic location.

17. A server system comprising:
a non-transitory computer-readable medium; and
program instructions stored on the non-transitory computer-readable medium and executable by at least one processor to:
facilitate an experience sharing session between a sharing device and one or more viewing devices by receiving a share in real-time from the sharing device and transmitting at least a portion of the share to the one or more viewing devices in real-time, wherein the sharing device comprises a head-mountable device (HMD), and wherein the share is based on point-of-view video captured at the HMD;

during the experience sharing session:
  receive a plurality of comments associated with the share, wherein the plurality of comments are received from one or more of the viewing devices;
  determine a context of the sharing device based on one or more context signals, wherein each of the one or more context signals provides information pertaining to a state or an environment of the sharing device;
  based at least in part on the context of the sharing device, determine filter criteria that corresponds to the context;
  filter the received comments in real-time based on the determined filter criteria, wherein the filtering comprises: (a) determining a rating for each received comment according to the determined filter criteria and (b) determining a first ranking of the received comments based on the respective ratings of the received comments; and
  initiate delivery, to the sharing device, of one or more of the highest-ranking received comments indicated by the first ranking; and at a later time during the experience sharing session:
  (a) determine a second context of the sharing device, wherein the second context is different from the previously determined context;
  (b) in response to determining the second context that differs from the previously determined context, update the filter criteria;
  (c) use the updated filter criteria as a basis to determine a second respective rating for each received comment and for any comment received subsequent to the real-time delivery of one or more of the highest-ranking received comments indicated by the first ranking;
  (d) determine a second ranking of the comments rated using the updated filter criteria based on the respective second ratings of the comments rated using the updated filter criteria; and
  (e) initiate real-time delivery, to the sharing device, of one or more of the highest-ranking comments indicated by the second ranking.

18. An article of manufacture including a non-transitory computer-readable storage medium having instructions stored thereon that, in response to execution by a processor, cause the processor to perform functions, the instructions comprising:

instructions for facilitating an experience sharing session between a sharing device and one or more viewing devices, wherein facilitating the experience sharing session comprises receiving a share in real-time from the sharing device and transmitting at least a portion of the share to one or more of the viewing devices in real-time, wherein the sharing device comprises a head-mountable device display (HMD), and wherein the share is based on point-of-view video captured at the HMD;

instructions for, during the experience sharing session:
  receiving a plurality of comments associated with the share, wherein the plurality of comments are received from one or more of the viewing devices;
  determining a context of the sharing device based on one or more context signals, wherein each of the one or more context signals provides information pertaining to a state or an environment of the sharing device;
  based at least in part on the context of the sharing device, the server system determining filter criteria that corresponds to the context;
  filtering the received comments in real-time based on the determined filter criteria, wherein the filtering comprises: (a) determining a respective rating for each received comment according to the determined filter criteria and (b) determining a first ranking of the received comments based on the respective ratings of the received comments; and
  initiating real-time delivery, to the sharing device, of one or more of the highest-ranking received comments indicated by the first ranking; and at a later time during the experience sharing session, the server system:
  (a) determining a second context of the sharing device, wherein the second context is different from the previously determined context;
  (b) in response to determining the second context that differs from the previously determined context, the server system updating the filter criteria;
  (c) using the updated filter criteria as a basis for determining a second respective rating for each received comment and for any comment received subsequent to the real-time delivery of one or more of the highest-ranking received comments indicated by the first ranking;
  (d) determining a second ranking the comments rated using the updated filter criteria based on the respective second ratings of the comments rated using the updated filter criteria; and
  (e) initiating real-time delivery, to the sharing device, of one or more of the highest-ranking comments indicated by the second ranking.

* * * * *